United States Patent
Spitz et al.

(10) Patent No.: US 10,409,802 B2
(45) Date of Patent: Sep. 10, 2019

(54) DATA QUALITY ANALYSIS

(71) Applicant: Ab Initio Technology LLC, Lexington, MA (US)

(72) Inventors: Chuck Spitz, Wellesley, MA (US); Joel Gould, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 130 days.

(21) Appl. No.: 15/175,793

(22) Filed: Jun. 7, 2016

(65) Prior Publication Data

US 2016/0364434 A1   Dec. 15, 2016

Related U.S. Application Data

(60) Provisional application No. 62/174,997, filed on Jun. 12, 2015.

(51) Int. Cl.
| | |
|---|---|
| *G06F 17/00* | (2019.01) |
| *G06F 16/23* | (2019.01) |
| *G06F 16/248* | (2019.01) |
| *G06F 16/2455* | (2019.01) |
| *G06F 16/215* | (2019.01) |

(52) U.S. Cl.
CPC ........ *G06F 16/2365* (2019.01); *G06F 16/215* (2019.01); *G06F 16/248* (2019.01); *G06F 16/24568* (2019.01)

(58) Field of Classification Search
CPC ......... G06F 17/30371; G06F 17/30303; G06F 17/30; G06F 16/2365; G06F 16/24568; G06F 16/215; G06F 16/248

USPC .................................................. 707/600–899
See application file for complete search history.

(56) References Cited

U.S. PATENT DOCUMENTS

| | | | |
|---|---|---|---|
| 2009/0216728 A1* | 8/2009 | Brainerd | ........... G06F 17/30554 |
| 2015/0058278 A1 | 2/2015 | Fankhauser | |

OTHER PUBLICATIONS

International Search Report and Written Opinion in PCT/US2016/036813, dated Aug. 4, 2016 (13 pages).
International Preliminary Report on Patentability in PCT/US2016/036813, dated Dec. 21, 2017.

* cited by examiner

*Primary Examiner* — Isaac M Woo
(74) *Attorney, Agent, or Firm* — Fish & Richardson P.C.

(57) ABSTRACT

A method includes receiving information indicative of an output dataset generated by a data processing system; identifying, based on data lineage information relating to the output dataset, one or more upstream datasets on which the output dataset depends; analyzing one or more of the identified one or more upstream datasets on which the output dataset depends. The analyzing includes, for each particular upstream dataset of the one or more upstream datasets, applying one or more of: (i) a first rule indicative of an allowable deviation between a profile of the particular upstream dataset and a reference profile for the particular upstream dataset, and (ii) a second rule indicative of one or more allowable values or prohibited values for each of one or more data elements in the particular upstream dataset, and based on the results of applying the one or more rules, selecting one or more of the upstream datasets. The method includes outputting information associated with the selected one or more upstream datasets.

56 Claims, 22 Drawing Sheets

| | Business Name | Not Blank | | Minimum | Maximum | Pattern | |
|---|---|---|---|---|---|---|---|
| 1 | custid (1000023) | ☑ | 1 | 1000000 | 1400000 | S"9999999" | |
| 2 | first (PARTHENIA) | ☑ | 1 | | | | |
| 3 | middle (G) | ☐ | | | | | |
| 4 | last (GEOFFROY) | ☑ | 1 | | | | |
| 5 | street (5930-HAMILTON-B| | ☑ | | | | | |
| 6 | city (ALLENTOWN) | ☑ | 4 | | | r"[A-Z]+" | 480 |
| 7 | state (PA) | ☑ | | | | S"AA" | 1 |
| 8 | zipcode (18106) | ☐ | | | | S"99999" | |
| 9 | statename (Pennsylvannia) | ☐ | | | | | |
| 10 | sex (F) | ☐ | | | | | |
| 11 | birthday (1932-07-05) | ☐ | | 1900-01-01 33 | 2011-12-31 | | |
| 12 | phonenum (878-766-3855) | ☐ | | | | S"999-999-99 | 4 |
| 13 | email (parthenia_geoffroy) | ☐ | | | | | |
| 14 | start_date (1994-09-18) | ☐ | | | | | |
| 15 | termination_date (ACTIVE) | ☐ | | | | | |
| 16 | active_flag (Y) | ☐ | | | | | |
| 17 | monthly_payment (267.54) | ☐ | | 10.00 430 | | | |
| 18 | credit_card (432262378306 | ☐ | | | | | |
| 19 | card_expiration (082014) | ☐ | | | | | |
| 20 | favcolor (violet) | ☐ | | | | | |
| 21 | linefeed (blank) | ☐ | | | | | |

Search this ruleset... ⊗

| Valid Values | Maximum Length | genetic | Valid for Type | special values | validated at |
|---|---|---|---|---|---|
| | | | ☑ 2 | | |
| | 11 | 1 | ☑ | | |
| | | | ☑ | | |
| | | | ☑ | | |
| | | | ☑ | | |
| | | | ☑ | | |
| M"StateCode" 2 | | Check Freq (9-10) | ☑ | | |
| | | | ☑ 9 | | decimal (") |
| M"StateNa: 3886 | | | ☑ | | |
| V"M,F" 366 | | | ☑ | | |
| | | | ☑ 2 | 9999-12-31 | date("YYYY-MM-DD") |
| | | | ☑ | | |
| | | Valid Email 1048 | ☑ | | |
| | | | ☑ | | |
| | | | ☑ | ACTIVE"" | |
| V"Y,N" 1 | | | ☑ | | |
| | | | ☑ | | |
| | | | ☑ | | |
| | | | ☑ 1 | | |
| | | | ☑ | | |
| | | | ☑ | | |
| | | | | | |
| | | | | | |
| | | | | | |
| | | | | | |

[ ▼ ]   [ OK ] [ Cancel ]

FIG. 4B

| Cust_ID | State | Purchase_price |
|---|---|---|
| 12575 | CA | 127.51 |
| 35468 | MA | 547.77 |
| 26842 | NY | 29.80 |
| 32458 | TX | 245.01 |
| 54893 | IL | 55.76 |
| 05786 | TX | 18.76 |
| 65420 | CA | 442.10 |
| 12475 | CA | 54.30 |
| 54978 | NY | 22.99 |
| 97845 | IR | 65.17 |
| 65432 | IL | 18.19 |
| 54983 | CA | 25.44 |
| 32877 | TX | 509.60 |
| 54446 | TX | 63.12 |
| 23158 | CA | 45.18 |
| 35458 | NY | 56.04 |
| 87653 | IR | 17.10 |
| 65487 | NY | 152.60 |
| 32455 | CA | 146.12 |
| 54877 | IL | 33.32 |
| 78361 | TX | 423.01 |
| 12756 | DE | 18.76 |
| 45886 | TX | 87.45 |
| 32115 | CA | 108.69 |
| 68575 | CA | 146.08 |

| Phone_number | Start_time | Duration |
|---|---|---|
| 6508001245 | 12:45:00 PM | 0:30 |
| 4082604525 | 12:45:08 PM | 1:15 |
| 212508412E | 12:45:12 PM | 10:12 |
| 6174438771 | 12:45:18 PM | 8:07 |
| 3024023548 | 12:45:22 PM | 0:02 |
| 21445893546 | 12:45:25 PM | 12:17 |
| 972450546S | 12:45:30 PM | 8:32 |
| 917508459E | 12:45:30 PM | 0:09 |
| 7738645947 | 12:45:32 PM | 1:12 |
| 2105782156 | 12:45:35 PM | 4:01 |
| 4085647895 | 12:45:38 PM | 0:14 |
| 6174546824 | 12:45:40 PM | 2:08 |
| 214568778F | 12:45:41 PM | 14:16 |
| 7735684456 | 12:45:42 PM | 9:12 |
| 6175443215 | 12:45:45 PM | 58:17 |
| 212565788E | 12:45:46 PM | 7:26 |
| 3025488865 | 12:45:49 PM | 0:16 |
| 9175453256 | 12:45:50 PM | 1:38 |

FIG. 10B

DATA QUALITY ANALYSIS

BACKGROUND

This description relates to data quality analysis. The data quality of a set of data is an indication of whether the data records in the set of data have errors. Often, the data quality of a set of data is poor when an error occurs during processing of the set of data.

SUMMARY

In a general aspect, a method includes receiving information indicative of an output dataset generated by a data processing system; identifying, based on data lineage information relating to the output dataset, one or more upstream datasets on which the output dataset depends; analyzing one or more of the identified one or more upstream datasets on which the output dataset depends. The analyzing includes, for each particular upstream dataset of the one or more upstream datasets, applying one or more of: (i) a first rule indicative of an allowable deviation between a profile of the particular upstream dataset and a reference profile for the particular upstream dataset, and (ii) a second rule indicative of one or more allowable values or prohibited values for each of one or more data elements in the particular upstream dataset, and based on the results of applying the one or more rules, selecting one or more of the upstream datasets. The method includes outputting information associated with the selected one or more upstream datasets.

Embodiments can include one or more of the following features.

One or more of the first rule and the second rule are automatically generated. The first rule is automatically generated based on an automated analysis of historical profiles of the particular upstream dataset. The reference profile is based on an historical average profile for the particular upstream dataset. The second rule is automatically generated based on an automated analysis of historical values for the one or more data elements in the particular upstream dataset. The allowable value or prohibited value is determined based on the automated analysis.

One or more of the first rule and the second rule are specified by a user.

The method includes receiving a specification of one or more of the first rule and the second rule through a user interface.

Data lineage information indicates one or more datasets that the output dataset depends on, one or more datasets that depend on the output dataset, or both.

Analyzing each of the one or more datasets to identify a subset of the datasets includes determining which of the one or more datasets have errors or possible errors; and the method includes selecting the datasets that have errors or possible errors for the sub set.

Analyzing each of the one or more datasets to identify a subset of the datasets includes identifying a particular dataset for which the deviation between the profile of the particular dataset and the reference profile for the particular dataset exceeds the allowable deviation indicated by the corresponding first rule; and the method includes selecting the particular dataset for the subset.

Analyzing each of the one or more datasets to identify a subset of the datasets includes identifying a particular dataset having a data element with a value that does not satisfy the allowable or prohibited value indicated by the corresponding second rule; and the method includes selecting the particular dataset for the subset.

The method includes identifying a data element in the output dataset, and in which identifying the one or more datasets on which the output dataset depends includes identifying datasets that affect the identified data element in the output dataset. Identifying a data element in the output dataset includes identifying a data element that has an error or a possible error.

The method includes generating a profile of one or more of the upstream datasets. Generating a profile of a particular dataset includes generating a new profile of the particular dataset when a new version of the particular dataset is received.

The reference profile for a particular dataset is derived from one or more previous profiles of the particular dataset.

Outputting information associated with the subset of datasets includes outputting an identifier of each of the datasets of the subset.

Outputting information associated with the subset of datasets includes outputting an indicator of an error or possible error associated with each of the datasets of the sub set.

The method includes displaying a representation of the data processing system on a user interface, and in which outputting information associated with the subset of datasets includes displaying information associated with a particular dataset of the subset in a vicinity of a representation of the particular dataset of the subset of datasets. The displayed information associated with the particular dataset of the subset includes a value indicative of a deviation between the profile of the particular dataset and the reference profile for the particular dataset. The displayed information associated with the particular dataset of the subset includes a value representative of a number of data elements in the particular dataset that do not satisfy the allowable value or prohibited indicated by the corresponding second rule. The method includes displaying an information bubble or pop-up window showing information about the subset of datasets.

The method includes providing a user interface to enable a user to add a rule, modify a rule, or remove a rule.

The datasets include one or more source datasets and one or more reference datasets, the source datasets including data elements to be processed by the data processing system, the reference datasets including reference values that are referenced by the data processing system in processing the data elements in the source datasets. The reference datasets include data associated with a business entity associated with the data processing system and the source datasets include data associated with customers of the business entity.

The data processing system includes transform elements, and the method includes identifying, based on the data lineage information, one or more transform elements that affect the output dataset. The method includes determining which one or more of the transform elements have errors or possible errors. The method includes determining whether a particular data processing elements has errors or possible errors based on an implementation date associated with the particular transform element.

In a general aspect, a non-transitory computer-readable medium stores instructions for causing a computing system to receive information indicative of an output dataset generated by a data processing system; identify, based on data lineage information relating to the output dataset, one or more upstream datasets on which the output dataset depends; analyze one or more of the identified one or more upstream datasets on which the output dataset depends. The analyzing includes, for each particular upstream dataset of the one or more upstream datasets, applying one or more of (i) a first rule indicative of an allowable deviation between a profile of the particular upstream dataset and a reference profile for the particular upstream dataset, and (ii) a second rule indicative of one or more allowable values or prohibited values for each of one or more data elements in the particular upstream dataset; and based on the results of applying the one or more rules, selecting one or more of the upstream datasets. The instructions cause the computing system to output information associated with the selected one or more upstream datasets.

In a general aspect, a computing system includes a processor coupled to a memory. The processor and memory are configured to receive information indicative of an output dataset generated by a data processing system; identify, based on data lineage information relating to the output dataset, one or more upstream datasets on which the output dataset depends; analyze one or more of the identified one or more upstream datasets on which the output dataset depends. The analyzing includes, for each particular upstream dataset of the one or more upstream datasets, applying one or more of (i) a first rule indicative of an allowable deviation between a profile of the particular upstream dataset and a reference profile for the particular upstream dataset, and (ii) a second rule indicative of one or more allowable values or prohibited values for each of one or more data elements in the particular upstream dataset; and based on the results of applying the one or more rules, selecting one or more of the upstream datasets. The processor and memory are configured to output information associated with the selected one or more upstream datasets.

In a general aspect, a computing system includes means for receiving information indicative of an output dataset generated by a data processing system; means for identifying, based on data lineage information relating to the output dataset, one or more upstream datasets on which the output dataset depends; means for analyzing one or more of the identified one or more upstream datasets on which the output dataset depends. The analyzing includes for each particular upstream dataset of the one or more upstream datasets, applying one or more of (i) a first rule indicative of an allowable deviation between a profile of the particular upstream dataset and a reference profile for the particular upstream dataset, and (ii) a second rule indicative of one or more allowable values or prohibited values for each of one or more data elements in the particular upstream dataset; and based on the results of applying the one or more rules, selecting one or more of the upstream datasets. The computing system includes means for outputting information associated with the selected one or more upstream datasets.

In a general aspect, a method includes upon identifying an error or possible error in a data element of a downstream dataset of a data processing system, automatically identifying, based on data lineage information relating to the downstream dataset, one or more upstream datasets that affect the data element; determining which of the upstream datasets have errors or possible errors, including analyzing a current profile and a reference profile of each of the identified upstream datasets; and outputting information associated with each of the upstream datasets that are determined to have errors or likely have errors.

Aspects can include one or more of the following advantages.

The approach described here can help a user, such as a data analyst or application developer, to quickly identify the root cause of a data quality issue. For instance, reference data in a data processing system is frequently updated but may not necessarily be thoroughly checked before deployment. Errors in reference data can lead to data quality issues in downstream data processed using the reference data. An analysis of the root cause of a data quality issue in a downstream set of data can help to identify reference data, or other upstream data, having data quality issues that may have affected the data quality of the downstream set of data. User notification of potential data quality issues can help the user to proactively manage data processing.

Other features and advantages of the invention will become apparent from the following description, and from the claims.

DESCRIPTION OF DRAWINGS

FIG. 4 is a diagram of a user interface.
FIG. 8C is an example of records.
FIG. 10B is an example of records.

DESCRIPTION

We describe here an approach to identifying the root cause of a data quality issue based on a data lineage analysis. If a data quality issue is identified in a downstream set of data, the upstream sets of data and upstream transform elements (sometimes called upstream data lineage elements) from which the downstream set of data was derived are identified. The quality of each the upstream data lineage elements is evaluated to identify one or more of the upstream data lineage elements that may itself have a data quality issue that contributed to the data quality issue in the downstream set of data. In some examples, a profile characterizing each upstream set of data is compared to a baseline profile, such as an historical average profile, for that set of data to determine whether the set of data has a data quality issue. In some examples, a value in a field of an upstream set of data is compared to one or more allowed or prohibited values for the field to determine whether the set of data has a data quality issue.

Data lineage is information that describes the life cycle of data records that are processed by a data processing system. Data lineage information for a given dataset includes an identifier of one or more upstream datasets on which the given dataset depends, one or more downstream datasets that depend on the given dataset, and one or more transforms that process data to generate the given dataset. By a downstream dataset depending on an upstream dataset, we mean that the processing of the upstream dataset by the data processing system directly or indirectly results in the generation of the downstream dataset. The generated downstream dataset can be a dataset that is output from the data processing system (sometimes referred to as an output dataset) or can be a dataset that is to be processed further by the data processing system (sometimes referred to as an intermediate dataset). The upstream dataset can be a dataset input into the data processing system (sometimes referred to as an input dataset or a reference dataset) or a dataset that has already undergone processing by the data processing system (sometimes referred to as an intermediate dataset). A transform is a data processing operation that is applied to an upstream dataset to produce a downstream dataset that is provided to a data sink. A data lineage diagram is a graphical depiction of data lineage elements in a data processing system.

Figure 1:
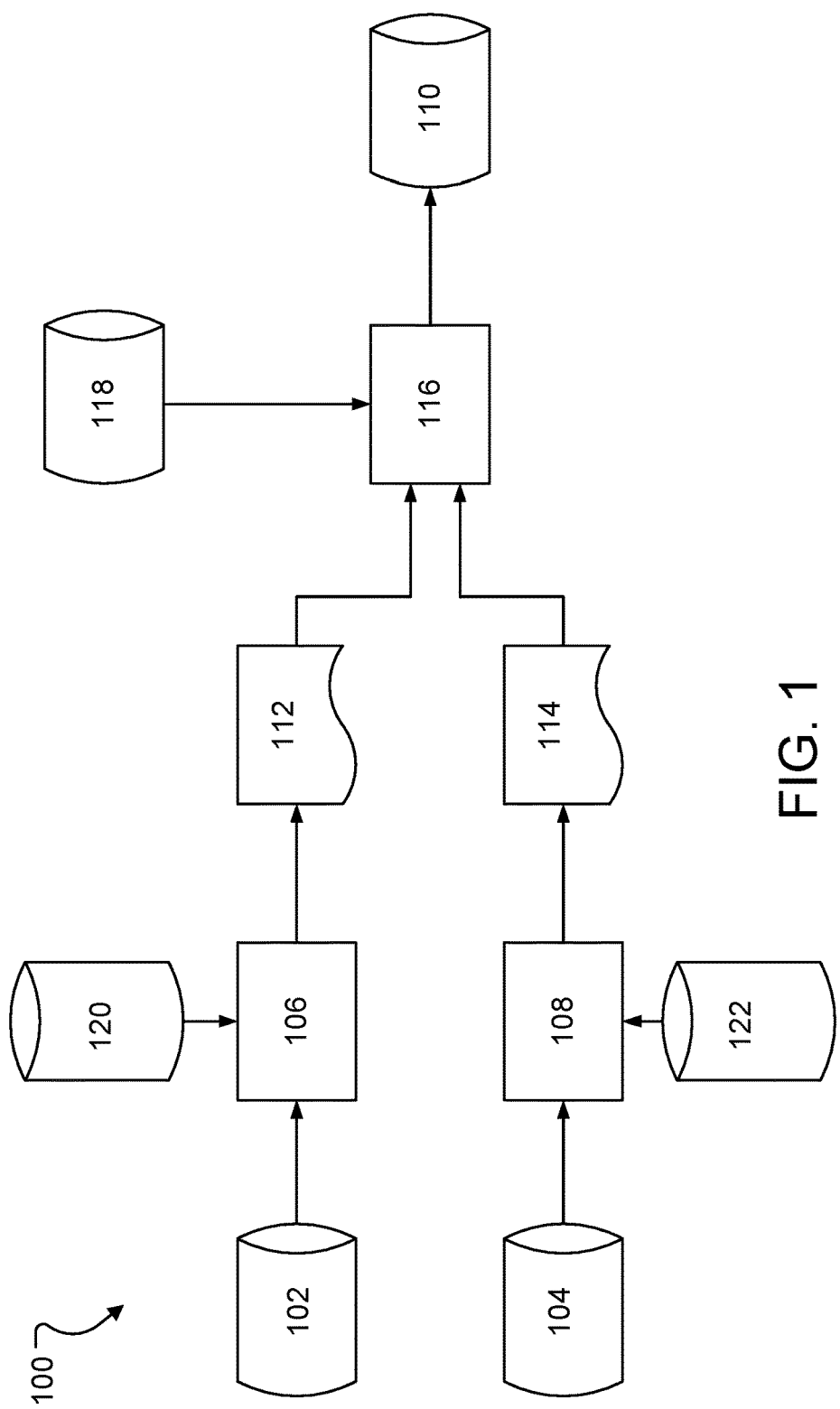
FIGS. 1 and 2 are data lineage diagrams.

FIG. 1 is an example data lineage diagram 100 for output data 110 generated by a data processing system. In the example of FIG. 1, the data processing system receives two sets of source data 102, 104. The source data can be data records stored in or received from, for instance, a file such as a flat file, a database such as a relational database or an object database, a queue, or another repository for storing data in a computing system. For instance, the source data 102 can be data records of credit card transactions in the U.S. stored in a file "US_feed.dat." Each data record can include a value for each of one or more fields, such as attributes defined within a record structure or columns in a database table. The source data 102, 104 can be received and processed in batches, for instance, data from a file or database that is processed hourly, daily, weekly, monthly, quarterly, yearly, or at another interval. The source data 102, 104 can be received as a stream and processed continuously, for instance, buffered by a queue and processed as data is available and system resources allow.

The source data 102 is processed by a transform element 106, which operates on the source data 102, for instance, to change the source data 102 in some way. The transform element can be an executable program that can manipulate data, such as a java program executed within a virtual machine, an executable, a data flow graph, or another type of executable program. For instance, the transform element 106 can be an executable named "TransformA.exe". In a specific example, the transform elements 106 can be a filter component that filters out unwanted data records from the source data 102, such as data records having an incorrect format. The transform element 106 processes the source data 102 in view of reference data 120 to produce intermediate data 112. Reference data is data that is used by a transform element to enable the transform element to process of data. For instance, reference data that enables a mapping operation includes one or more fields having values that correspond to values in one or more fields in the data being processed. The intermediate data 112 can be stored in a file, a database, a queue, or another repository for storing data in a computing system.

A transform element 108 processes the set of source data 104 in view of reference data 122 to produce intermediate data 114. The intermediate data 114 can be stored in a file, a database, a queue, or another repository for storing data in a computing system.

The intermediate data 112, 114 are processed together by a transform element 116, which makes use of reference data 118. In an example, the transform element 116 is a mapping operation and the reference data 118 includes data records that indicate state values and corresponding region values. When the intermediate data 112, 114 are processed by the transform element 116, the value in the state field in each data record in the intermediate data 112, 114 is mapped to the corresponding region as indicated in the reference data 118. In an example, the reference data 118 include business data that indicate corporate business units and corresponding department identifiers, manager names, and locations. When the intermediate data 112, 114 are processed by the transform element 116, each data record is assigned to a corporate business unit based on the mapping enabled by the set of reference data. Reference data 118 can be used to process multiple sets of data and is unchanged by the processing. Reference data 118 can be updated by a user periodically or as needed.

The transform element 116 outputs the output data 110, which is stored in a file, a database, a queue, or another repository for storing data in a computing system. The output data 110 can be further processed, e.g., by other transform elements in the same data processing system or in a different data processing system, or can be stored for future analysis.

In the example of FIG. 1, the data lineage of the output data 110 is shown for data lineage elements in a single data processing system. In some examples, the data lineage of a set of data can be tracked through multiple data processing systems. For instance, source data can be initially processed by a first data processing system to produce output data X. A second data processing system reads the output data X from the first data processing system and processes the output data X to generate output data Y. The output data Y is processed by a third data processing system to generate output data Z. The data lineage of the output data Z includes the initial source data, the transforms included in each of the three data processing systems, and any reference data used during processing by any of the three data processing systems.

In some examples, output data can be generated by a more complex data processing system, such as shown in the example end-to-end data lineage diagram 200A for a target element 206A. In the data lineage diagram 200A, connections are shown between data elements 202A and transform elements 204A. Data elements 202A can represent datasets, tables within datasets, columns in tables, fields in files, or other data. An example of a transform element is an element of an executable that describes how a single output of a data element is produced. The root cause of a potential data quality issue in a target element 206A (or in another data element 202A) can be tracked in the data processing system of FIG. 2. Further description of FIG. 2 can be found in U.S. Patent Publication No. 2010/0138431, the contents of which are incorporated here by reference in their entirety.

Figure 2:
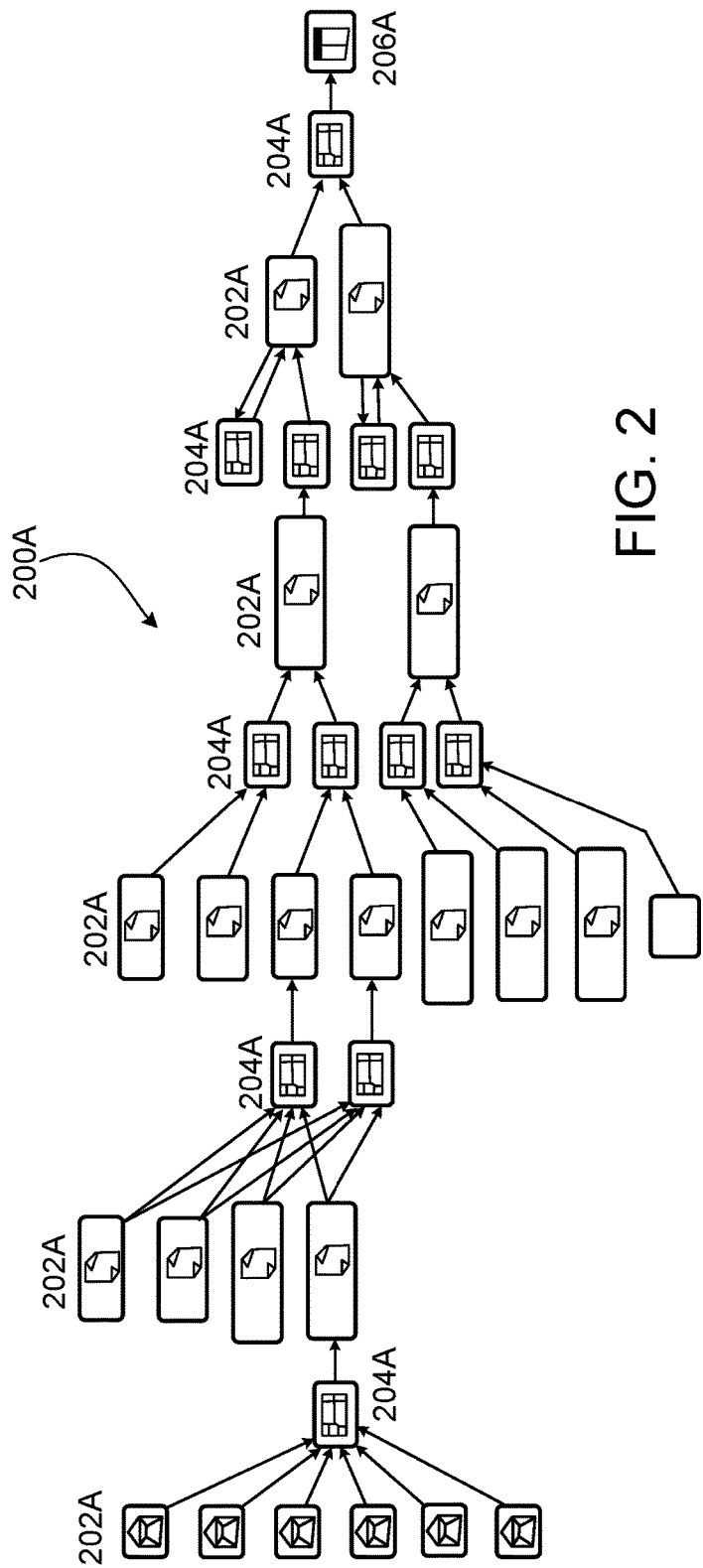

The information shown in a data lineage diagram, such as the data lineage diagram of FIG. 1 or FIG. 2, illustrates which upstream data sources, data sinks, or transforms affect a downstream data. For instance, the data lineage diagram 100 of FIG. 1 reveals that the output data 110 is affected by the source data 102, 104, the reference data 118, 120, 122, and the transform elements 106, 108, 116.

Understanding the lineage of a downstream set of data (such as the output data 110) can be useful in identifying the root cause of a data quality issue that may occur in the downstream data. By root cause of a data quality issue, we mean an identification of an upstream system, operation, or set of data that is at least partially a cause of the data quality issue in the downstream data. A data quality issue in a downstream set of data, such as in the output data 110, can be due to poor quality source data, poor quality reference data, or an error in a transform element in the upstream lineage of the set of output data 110, or a combination of any two or more of them. Tracking the quality or status of data lineage elements can provide information that can be used to evaluate a possible root cause of poor quality output data.

By the data quality of a set of data, we mean generally whether the set of data has the expected characteristics. Poor data quality can be manifest in a set of data not behaving as expected, for instance, falling outside of statistical norms, returning a lookup failure in response to a standard query, or another type of behavior. The quality of a set of data can be characterized based on a profile of some or all of the data records in the set of data or based on the value in each of one or more fields of a specific data record or both, discussed below.

Poor data quality in a set of downstream data (e.g., the output data 110) can be traced to any of various factors in the upstream data lineage of the output data. One possible cause of poor quality output data can be poor quality source data, poor quality reference data, or both. For instance, a set of source data may have been corrupted or cut off during transmission, may be the wrong set of data, may have missing data, or may have another problem. A set of reference data may have been exposed to an error in a recent update to the set of reference data, may be corrupted, may be the wrong set of data, or may have another problem. Another possible cause of poor quality output data can be an issue with a transform element in the upstream data lineage of the output data. For instance, if the software implementing a transform element was recently updated to a new version, the transform element may no longer perform the desired processing if, for example, the updated software has an error or has been corrupted. Source data, reference data, and transform elements in the data lineage of the set of output data 110 can be monitored to facilitate preemptive identification of a potential data quality issue that may occur in the set of output data, subsequent tracking of the root cause of a data quality issue that occurred in the set of output data, or both.

Monitoring and analysis of the source data and reference data can help a user to diagnose one or more possible causes of poor quality output data. For instance, if a set of poor quality output data is generated, analysis of the source data or reference data in the data lineage of the set of poor quality output data can indicate whether a given set of source data or reference data is itself of poor quality and thus a possible contributor to the poor quality output data. Monitoring of the source data and reference data can also preemptively identify poor quality source data or reference data that, if processed, may cause a data quality issue in downstream output data.

Figure 3A:
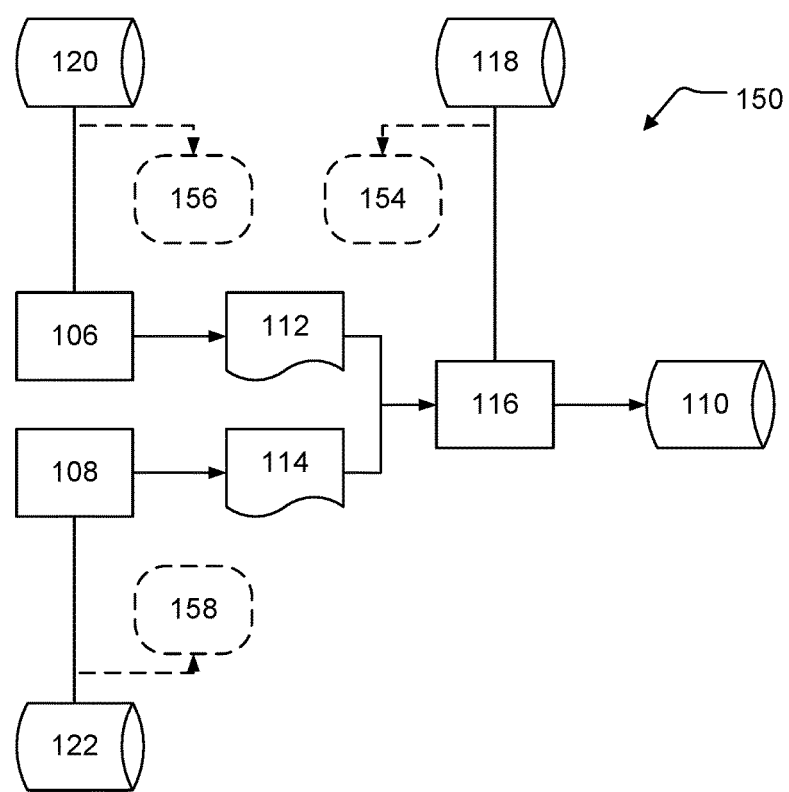
FIGS. 3A and 3B are data lineage diagrams.
Figure 3B:
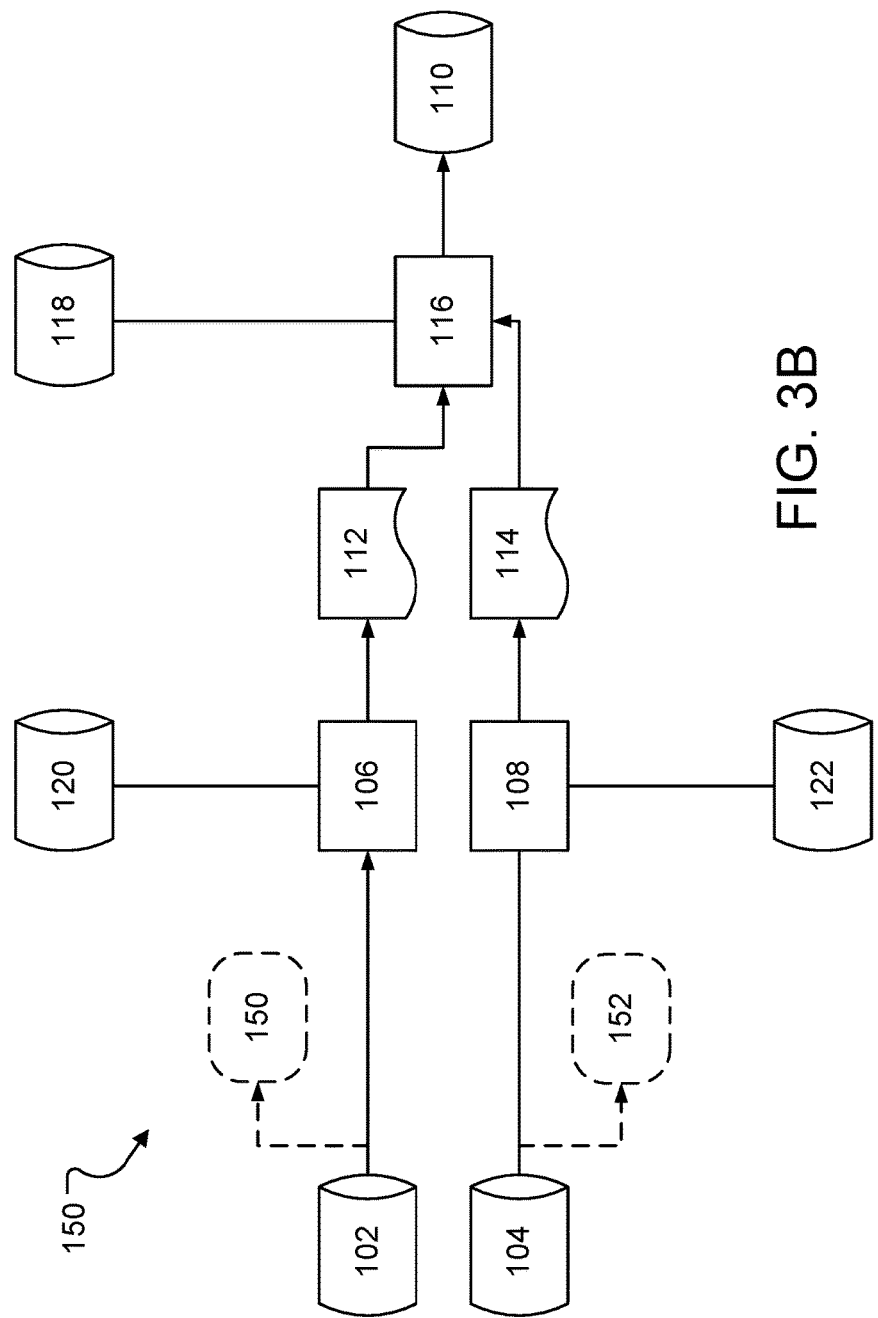

FIGS. 3A and 3B depicts an approach to tracking the root cause of a known or potential data quality issue in the set of output data 110 having the data lineage depicted in FIG. 1. Referring to FIG. 3A, prior to processing input data (e.g., the source data 102, 104 of FIG. 1), the quality of the reference data 118, 120, 122 is characterized by quality elements 154, 156, 158, respectively. In some examples, the quality of the reference data can be characterized when a set of reference data is updated, at scheduled times (e.g., periodically or when a reference data update is scheduled), prior to processing each set of input data, or at other times.

To characterize the quality of a set of data, a quality element calculates a profile (sometimes also called a census) of fields in the set of data. A profile of a set of data records is a summary, e.g., on a field-by-field basis, of the data values in the data records. A profile includes statistics characterizing the data values in each of one or more fields in each of at least some of the data records in the set, a histogram of values, a maximum value, a minimum value, an average (e.g., a mean or median) value, a standard deviation from the average value, a number of distinct values, or samples of the least common and most common values in one or more fields (e.g., for the critical data elements for each set of data), or other statistics. In some examples, a profile can include processed information characterizing the data values in each of one or more fields in the data records. For instance, a profile can include a classification of values in a field (e.g., a classification of data in an income data field into a high, medium, or low category), an indication of a relationship among data fields in individual data records (e.g., an indication that a state data field and a ZIP data field are not independent), relationships among data records (e.g., an indication that data records having a common value in a customer identifier field are related), or other information characterizing the data in the set of data records.

The quality element then applies one or more rules to identify any actual or potential data quality issues in the set of data. The rules can be specified by a user and can indicate an allowable or prohibited feature of the profile, as discussed further below. In a specific example, if a set of reference data includes a field listing US state abbreviations, an example rule can indicate that a data quality issue is to be identified if the number of distinct values in that field is greater than 50. In some examples, the rule can be based on historical profiles of the set of data, e.g., based on historical average values. If no data quality issue is identified in a set of data, the profile of the set of data can be used to update the rule, e.g., to update the historical average values. If a set of reference data is identified as having an actual or potential data quality issue, processing can be paused until the data quality issue is addressed.

Referring to FIG. 3B, the quality of the source data 102, 104 is characterized by quality elements 150, 152, respectively. The quality elements 150, 152 can characterize the data quality of the source data 102, 104, respectively, when data is received into the data processing system, prior to a scheduled processing of the respective source data, or at other times. If a set of source data is identified as having a known or potential data quality issue, information about the data quality issue can be output, e.g., to alert a user or to be stored in a data storage for future reference. For instance, as each quality element 150, 152 reads data from the corresponding set of data, the quality element 150, 152 calculates a profile of the set of data.

In a specific example, to calculate the profile of the source data 102, the quality element 150 can calculate the sum of all of the values in a transaction_amount field in the source data 102. A rule for the source data 102 can compare the sum of all of the values in the transaction_amount field to a mean and standard deviation of that sum over the past 30 runs, and can indicate that a data quality issue is to be identified if the sum of all of the values in the transaction_amount field for the source data 102 falls outside of one standard deviation from the mean value of the sum.

In some examples, a rule to be used to characterize the quality of a set of data can indicate an allowable feature or a prohibited feature of a profile of the data records in the set of data. A feature of a profile can be a value or range of values. A rule indicating an allowable feature of a profile is satisfied when the profile includes the allowable feature. An example of an allowable feature for a field can be allowable maximum and minimum values for that field; if the average value for the field falls between the allowable maximum and minimum values, the rule is satisfied. A rule indicating a prohibited feature of a profile is satisfied as long as the profile does not include the prohibited feature. An example of a prohibited feature for a field can be a list of values that are prohibited for that field; if the field includes any of the prohibited values, the rule is not satisfied.

A rule indicating a feature of a profile can indicate an allowable deviation between the profile of a field of a particular dataset and a reference profile for the field of the dataset. A deviation between the profile of a dataset and the reference profile for the dataset that is greater than the allowable deviation indicated by the corresponding rule can be an indication of a data quality issue in the dataset, and thus an indication that the dataset is a possible root cause of an existing or potential data quality issue in a downstream set of data. In some examples, the allowable deviation can be specified as a range of values, such as a maximum allowable value and a minimum allowable value. In some examples, the allowable deviation can be specified as a standard deviation from a single value, which can be an average value (e.g., a mean or median of values in past datasets).

In some examples, a rule to be used to characterize the quality of a set of data can indicate allowed or prohibited characteristics of the value in each of one or more fields of a data record, such as based on the validity of the value in a field. A rule indicating an allowed characteristic for a field is satisfied when the value in the field meets the allowed characteristic. A rule indicating a prohibited characteristic for a field is satisfied as long as the value in the field does not meet the prohibited characteristic. A value that satisfies a rule is sometimes referred to as a valid value; a value that does not satisfy a rule is sometimes referred to as an invalid value. Various characteristics of values in the fields can be indicated as allowed or prohibited characteristics by the rule. An example rule can indicate allowed or prohibited characteristics of the content of a field, such as an allowed or prohibited range of values, an allowable maximum value, an allowable minimum value, or a list of one or more particular values that are allowed or prohibited. For instance, a birth_year field having a value less than 1900 or greater than 2016 may be considered invalid. An example rule can indicate allowed or prohibited characteristics of the data type of a field. An example rule can indicate a whether the absence of a value (or the presence of a NULL) in a certain field is allowed or prohibited. For instance, a last_name field including a string value (e.g., "Smith") may be considered valid, while a last_name field that is blank or that includes a numerical value may be considered invalid. An example rule can indicate an allowed or prohibited relationship among two or more fields in the same data record. For instance, a rule may specify a list of values for a ZIP field that correspond to each possible value for a state field and may specify that any combination of values for the ZIP and state fields that is not supported by the list is invalid.

In some examples, a rule can be generated based on an automated analysis of historical data. We refer to this type of rule as an automatically generated rule. An automatically generated rule can indicate an allowable feature or a prohibited feature of a profile of the data records in a set of data. For instance, an automatically generated rule for a profile can be indicative of an allowable deviation between the profile of a field of a particular set of data and an automatically determined historical reference profile of the field of the set of data. The historical reference profile for a dataset can be based on historical data; for instance, the historical reference profile can be a profile of the same dataset from a previous day, an average profile of the same dataset from multiple previous days (e.g., over the past week or month), a lifetime average profile of the same dataset. More generally, the reference profile can retain a wide variety of reference information to take advantage of various kinds of statistical analyses. For example, the reference profile can include information about standard deviations or other indications of a distribution of values. For purposes of the examples below, and without limiting the generality of this application, we will assume that the reference profile includes a numerical average of prior datasets, and possibly also a standard deviation.

An automatically generated rule can indicate an automatically determined allowed or prohibited characteristic of the value in a field of a data record. In an example, an automatically generated rule for a field can indicate an allowable maximum or minimum value for the field based on an analysis of historical maximum or minimum values for the field. In an example, an automatically generated rule for a field can indicate a list of allowed values for a field based on an analysis of values that have occurred previously for the field. In some examples, an automatically generated rule is specified for every field of a set of data. In some examples, a rule is specified for a subset of the fields. The fields for which a rule is specified can be automatically identified, e.g., based on an analysis of the data records. For instance, any field in a set of data records that typically has a small number of distinct values (sometimes referred to as a low cardinality field) can be identified as a field for which an automatically generated rule can be generated.

In some examples, machine learning techniques are employed to generate the automatically generated rules. For instance, data can be analyzed over a learning period in order for historical averages or expected values to be identified prior to generation of the rules. The learning period can be a specified period of time or can be an amount of time until an average or expected value converges to a stable value.

In some examples, a rule can be specified by a user. We refer to this type of rule as a user-specified rule. User-specified rules can specify an allowed or prohibited characteristic of a profile of a field of a particular dataset, an allowed or prohibited characteristic of a value in each of one or more field of a data record in a dataset, or both. A user can specify a rule, e.g., based on his understanding of expected characteristics of data records to be processed by the system. In some examples, a user-specified rule can be assigned a default that can be modified by a user.

In a specific example, the source data are credit card transaction records for transactions occurring in the United States. The source data are streaming data that are processed in one-hour increments. Based on his knowledge of the source data and of the operations to be performed when processing the credit card transaction records, the user can identify the transaction identifier field, the card identifier field, the state field, the date field, and the amount field as critical data elements to be profiled.

In the specific example in which the source data are credit card transaction records, the user may know that there are only fifty allowable values for the state field. The user can create a rule that causes an alert flag to be used if the profile of the set of source data identifies more than fifty values in the state field, regardless of the standard deviation of the profile of the set of source data relative to the reference. The user may also know that only credit card transaction records for transactions completed on the same day as the processing should be present in the set of source data. The user can create a rule that causes an alert message to be sent if any source data record has a date that does not match the date of the processing.

Referring to FIG. 4, in some examples, a user can specify one or more rules through a user interface 400. The example user interface 400 includes multiple rows 402 and multiple columns 404. Each row 402 is associated with a field 406 of the data records in a set of data, and each column 404 is associated with a rule 408. Through the user interface 400, a user can specify a rule for one or more fields 406 or can approve a pre-populated default rule for a field. Further description of the user interface 400 can be found in U.S. application Ser. No. 13/653,995, filed Oct. 17, 2012, the contents of which are incorporated here by reference in their entirety. Other implementations of the user interface 400 are also possible.

In some examples, if a possible data quality issue is detected in a set of data, such as in a new version of a set of reference data or in a set of source data, an identifier of the set of data having the possible data quality issue is placed on a list of root cause data sets stored in a database. If a data quality issue with a set of output data 110 is later detected, the database can be queried to identify the upstream data lineage elements for the set of output data 110 and to determine which, if any, of those upstream data lineage elements are included on the list of root cause data sets.

In some examples, if a possible data quality issue is detected in a set of data, such as a new version of a set of reference data or in a set of source data, a user notification can be enabled. In some examples, an alert flag can be stored to indicate the data quality issue. For instance, if a possible data quality issue is detected in a new version of a set of reference data, an alert flag can be stored in conjunction with the profile data for the new version of the reference data. If a possible data quality issue is detected in the set of source data, an alert flag can be stored in conjunction with the profile data for that set of source data. In some examples, an alert message can be communicated to a user to indicate the existence of a possible data quality issue. The alert message can be, for instance, as a message, an icon, or a pop-up window on a user interface; as an email or short message service (SMS) message; or in another form.

In some examples, the rules can specify one or more threshold deviations from the reference profile at which an alert flag or alert message is used. For instance, if the deviation between a profile of a current set of data and a reference profile for that set of data is small, such as between one and two standard deviations, the alert flag can be stored; and if the deviation is greater than two standard deviations, the alert message can be communicated. The threshold deviation can be specific to each set of source data and reference data.

In some examples, such as if the deviation is severe, e.g., more than three standard deviations from the reference profile, further processing by the data processing system can be stopped until a user intervenes. For instance, any further processing that will be affected by the source data or reference data having the severe deviation is halted. The transforms to be halted can be identified by the data that references the data lineage elements that are downstream of the affected source or reference data.

In some examples, the reference profile data are automatically determined. For instance, the reference profile data for a given set of data can be automatically updated as a running historical average of past profile data for that set of data, e.g., by recalculating the reference profile data whenever new profile data for that set of data are determined. In some examples, a user can supply initial reference profile data, e.g., by profiling a set of data having desired characteristics.

The update status of the transform elements 106, 108, 116 that are in the data lineage of the output data, such as the time or date of recent updates to each of the transform elements 106, 108, 116, can be tracked. With access to the timing of recent updates to the transform elements, a user can evaluate whether one or more of the transform elements, e.g., an incorrect or corrupted transform element, is a possible root cause of an existing or potential data quality issue in the output data 110. For instance, if the transform element 116 was updated shortly before the output data 110 was output from the transform element 116, the transform element 116 may be identified as a possible root cause of an existing or potential data quality issue in the output data 110.

Figure 5:
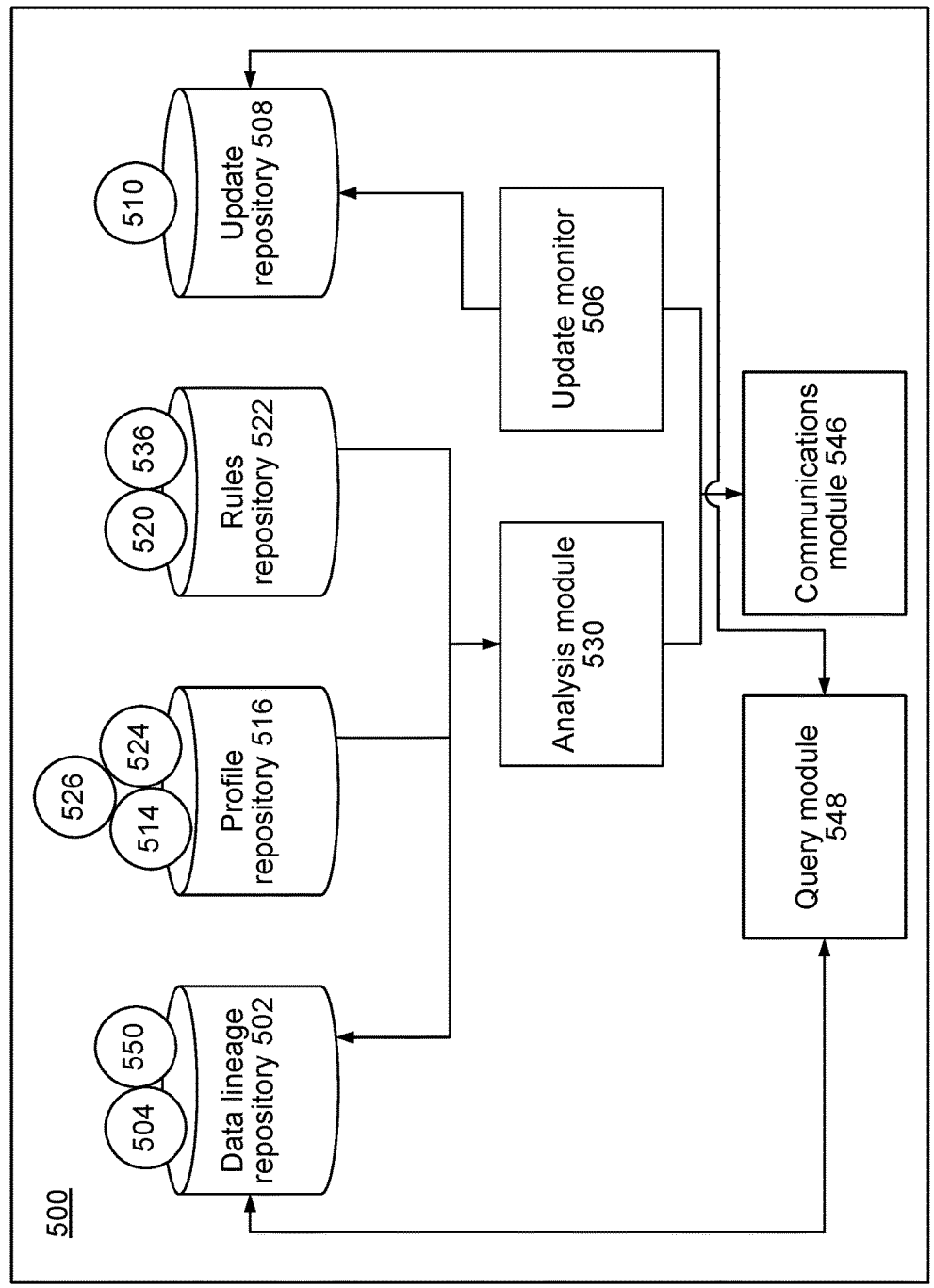
FIG. 5 is a system diagram.

Referring to FIG. 5, a tracking engine 500 monitors profiles of data lineage elements such as source and reference data and updates to data lineage elements such as reference data and transforms in the upstream data lineage of a given set of data, such as output data generated by a data processing system.

The tracking engine 500 includes a data lineage repository 502 that stores data 504 referencing the data lineage elements that are upstream of a given set of data, such as output data generated by a data processing system. For instance, the data lineage repository 502 can store identifiers of each data lineage element and data indicative of the relationships among the data lineage elements. The data lineage repository 502 can be a file, a database, or another data storage mechanism.

The tracking engine 500 includes an update monitor 506. The update monitor 506 monitors when transform elements and sets of reference data in a data processing system are updated. For each transform element referenced by the data lineage repository 502, the update monitor 506 monitors when the software implementing the transform element is updated. When an update occurs, the update monitor 506 stores an entry 510 in an update repository 508, such as a file, a database, or another data storage mechanism. The entry 510 indicates a timing of the update, such as a date or a time or both at which the software was updated. In some examples, the entry 510 can also include an indication of the nature of the update, such as a manually entered description of the update, the text of the lines of code that were changed by the update, or another indication of the nature of the update. The update repository 508 can be indexed by identifier of the transform elements or by timing of the updates or both.

For each set of reference data referenced by the data lineage repository 502, the update monitor 506 monitors when the set of reference data is updated. When an update occurs, the update monitor 506 stores an entry 514 in a profile repository 516, such as a file, a database, or another data storage mechanism. The entry 514 indicates a timing of the update, such as a date or a time or both at which the set of reference data was updated. The profile repository 516 can be indexed by identifier of the sets of reference data or by timing of the updates or both.

When a set of reference data is updated, the quality element for the set of reference data generates a profile of the updated reference data, sometimes also referred to as the new version of the reference data. The quality element can generate the profile according to a list 520 of critical data elements stored in a rules repository 522, such as a file, a database, or another storage mechanism. A critical data element is a field in a data record that is known to be of importance to a user or system, for instance, a field specified by a user or automatically identified. A profile is generated for each critical data element for the new version of the reference data. For instance, the profile that is generated for a given critical data element can be census data that indicates how many distinct values for the critical data element exist in the set of reference data and how many times each distinct value occurs. Reference profile data 524 indicative of the generated profile of each critical data element are stored in the profile repository 516, for instance, in association with the entry 514 indicative of the update to the reference data.

A profile of each set of source data referenced by the data lineage repository 502 is generated by the corresponding quality element when the source data is provided to the data processing application. A profile is generated for each critical data element in the source data, where the critical data elements are specified in the list 520 of critical data elements stored in the rules repository 522. Source profile data 526 indicative of the generated profile of each profiled set of source data is stored in the profile repository 516, such as a file, a database, or another data storage mechanism.

In some examples, the reference profile data 524 and the source profile data 526 are accessed only if a data quality issue arises in downstream output data. In some examples, the reference profile data 524, the source profile data 526, or both are analyzed by the profile module to determine whether the data are indicative of a potential data quality issue with the new version of the reference data or the received source data, respectively. The profile data 524, 526 can be analyzed shortly after the profile is generated or can be analyzed at a later point in time, for instance, any time the tracking engine has computing resources free for the analysis.

To analyze the reference profile data 524 or source profile data 526, an analysis module 530 applies rules 536 stored in the rules repository 222, such as automatically generated rules or user-specified rules. The rules can indicate, for instance, one or more critical data elements for each set of data, a threshold deviation that can give rise to a data quality issue, or other types of rules.

In some examples, if a potential data quality issue is detected in the new version of the reference data or in the set of source data, an identifier of the set of data having the potential data quality issue is placed on a list 550 of root cause data sets stored in the data lineage repository 502. If a user later detects a data quality issue with a set of downstream data, the user can query the data lineage repository 502 to identify the data lineage elements that are upstream of the set of output data, and to identify which, if any, of those upstream data lineage elements are included on the list 550 of root cause data sets.

In some examples, output data 110 is automatically analyzed to determine whether there is a possible data quality issue. For instance, each batch or time interval of the output data 110 can be profiled and profiling rules and validation rules can be applied to the output data 110, for instance, to compare a profile of current output data 110 to a reference profile of previous versions of the output data 110. If the profile of the current output data 110 deviates from the reference profile by more than a threshold amount, as specified in output data profiling rules, the current output data 110 can be identified as having a potential data quality issue. If a particular data element in the current output data 110 has a value that deviates from an expected range of values by more than a threshold amount, as specified in output data validation rules, the current output data 110 can be identified as having a potential data quality issue. An alert flag can be stored with the output data 110 in the data warehouse or a user can be notified, for instance, through a user interface or by a message.

In some examples, a user identifies a set of output data 110 as having a potential data quality issue. For instance, a business analyst preparing a report summarizing multiple sets of output data 110 may realize that one particular set of output data 110 makes little sense compared to the other sets of output data he is analyzing. The analyst can flag the particular set of output data 110 as having a potential data quality issue.

In the event that the output data has a data quality issue, information stored in the tracking engine 500 can be accessed in an attempt to identify the root cause of the data quality issue. For instance, an identifier of the output data, such as a file name or a time stamp, can be provided to a query module 548, e.g., automatically or by a user. The query module 548 queries each of the relevant repositories for information that may be relevant to the identified output data. In particular, the query module 548 queries the data lineage repository 502 to identify the transforms, source data, and reference data from which the identified output data depends. The query module 548 can then query the update repository for any entries 510 indicative of an update to any of the identified transform elements that occurred shortly before the processing of the output data. The query module 548 can query the profile repository 516 for any entries 514 indicative of an update to identified reference data along with the associated reference profile data 524 and any associated alert flat. The query module 548 can query the profile repository 516 for the source profile data 526 for any identified sets of source data.

The results returned responsive to the queries by the query module 548 are displayed on a user interface. The display enables the user to view and manipulate the data in order to gain an understanding of potential root causes of the data quality issue in the output data. For instance, if there was a software update to a transform element shortly before the output data was processed, the user can view information associated with the update, such as a description of the update or the lines of code that were changed. If there was an alert flag associated with reference or source profile data, the user can view the profile data.

In some examples, the results returned by the query module 548 can indicate that an update to a transform element occurred immediately before the transform element performed processing for the output data having a potential data quality issue. We sometimes refer to this as a recently updated transform element. By immediately before, we mean within a set amount of time, such as, e.g., within ten minutes, within one hour, within one day, or within another amount of time of the processing. The update monitor 506 can obtain additional information about recently updated transform elements that may indicate whether one or more of the recently updated transform elements are a potential root cause of the data quality issue in the output data. For instance, the update monitor 506 can identify any processing artifacts associated with the recently updated transform element. The presence of processing artifacts can be indicative of a potential problem with the recently updated transform element. The update monitor 506 can review an update log associated with the recently updated transform element to be sure that the update log reflects the update to the recently updated transform element. A disagreement between the update log and the data 510 indicative of an update to the recently updated transform element can be indicative of a potential problem with the transform element. The update monitor 506 can review a checksum or other system data to identify potential errors that may have been introduced during the updating of the recently updated transform element.

In some examples, if a potential problem with a recently updated transform element is detected, a user notification can be enabled. In some examples, an alert flag can be stored to indicate the potential problem, e.g., in the update repository 508 in conjunction with the data 510 indicative of the update. In some examples, an alert message can be communicated to a user by the communications module 546 to indicate the presence of a potential problem with a recently updated transform element. For instance, the alert message can be a message, an icon, a pop-up window on a user interface; an email or SMS message; or in another form. In some examples, data lineage and data quality analysis can be at the level of a data set, which we sometimes call coarse-grained data lineage. Coarse-grained data lineage views the data lineage of a downstream set of data. Upstream sets of data and upstream transform elements that are used to generate a downstream set of data are considered to be in the data lineage of the downstream set of data. In some examples, data lineage and data quality analysis can be at the level of an individual field, which we sometimes call fine-grained data lineage. Fine-grained data lineage views the data lineage of a particular field in a downstream set of data. Upstream transform elements and fields in upstream sets of data that are used to generate a particular field in a downstream set of data are considered to be in the data lineage of the downstream set of data. The approaches described here to data quality analysis can be applied in the context of both coarse-grained data lineage and fine-grained data lineage.

Further information about profiling can be found in U.S. Pat. No. 8,868,580, titled "Data Profiling," the contents of which are incorporated here by reference in their entirety. Typically, a data record is associated with a set of data fields, each field having a particular value for each record (including possibly a null value). In some examples, the data records in a set of data have a fixed record structure in which each data record includes the same fields. In some examples, the data records in a set of data have a variable record structure, for instance, including variable length vectors or conditional fields. In some examples, the profile module 218 can provide initial format information about data records in a set of data to the profile elements 150, 152, 154. The initial format information can include, e.g., the number of bits that represent a distinct value (e.g., 16 bits), the order of values, including values associated with record fields and values associated with tags or delimiters, the type of value represented by the bits (e.g., string, signed/unsigned integer, or other types), or other format information. The format information can be specified in a data manipulation language (DML) file that is stored in the rules repository 522. The profile elements 150, 152, 154 can use predefined DML files to automatically interpret data from a variety of common data system formats, such as SQL tables, XML files, or CSV file, or can use a DML file obtained from the rules repository 222 describing a customized data system format.

Figure 6:
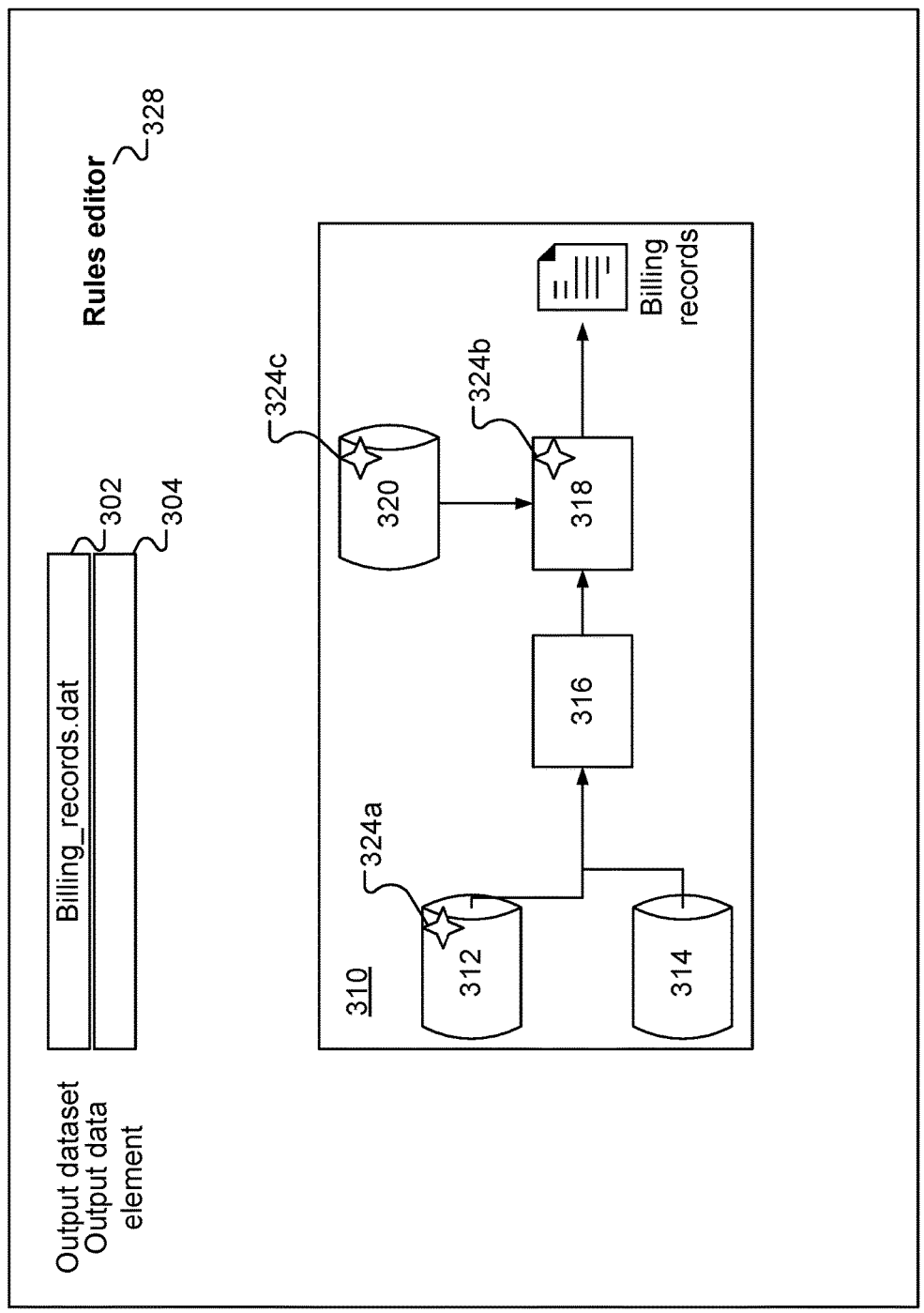
FIG. 6 is a diagram of a user interface.

FIG. 6 shows an example of a user interface 300 that enables a user to investigate the root cause of a potential data quality issue in the set of output data. Through the user interface 300, the user can enter an identifier 302 of a set of output data or an identifier 304 of a specific data element in the output data. For instance, the identifier 302 or 304 can identify a set of output data or a specific data element having a potential data quality issue. In the example of FIG. 4, the user entered the output dataset "Billing_records.dat." An interactive data lineage diagram 310 is displayed on the user interface 300 that graphically depicts the data lineage elements upstream of the identified set of output data 328 or the identified data element. In the example data lineage diagram 310, the data lineage elements that are upstream of the identified set of output data include two sets of source data 312, 314, two transform elements 316, 318, and one set of reference data 320.

Upstream data lineage elements that have possible data quality issues, such as the source data 312, the transform element 318, and the reference data 320 in this example, are marked with an alert flag 324a, 324b, 324c, respectively. The user can select an alert flag, such as by clicking or tapping on the alert flag, hovering a mouse pointer over the alert flag, or otherwise selecting the alert flag, to access information about the associated possible data quality issue. The information about the possible data quality issue associated with a set of data can include information such as profile data, reference profile data for one or more data elements, results of a statistical analysis of the profile data (such as a deviation of the profile data from the reference profile data), values that do not satisfy an allowable value specified by a validation rule, or other information. The information about a possible data quality issue associated with a transform element can include a date of the most recent update to the transform element, a description of the update, an excerpt of code from the update, or other information. In some examples, an information bubble can be overlaid on the data lineage diagram in response to user selection of one of the alert flags. In some examples, a new screen can be displayed in response to user selection of one of the alert flags. In some examples, the information displayed in the information bubble or new screen can be interactive such that the user can access further detailed information by selecting a piece of information.

Through the user interface 300, the user can also access a rules editor 328 through which the user can add, delete, or modify profiling rules, validation rules, or both. For instance, the user can add, delete, or modify the critical data elements for each set of data; update threshold deviations that cause identification of a potential data quality issue, specify whether a profiling or validation rule is to be applied automatically upon receipt of a new set of data or only upon detection of a downstream data quality issue, or make other changes to profiling or validation rules.

In a specific example, a data processing system processes telephone records to generate billing records. Each source data record represents a telephone call and includes fields storing data such as the date, the time of the call, the duration of the call, the dialing phone number, and the receiving phone number. The source data records are processed in a batch process on a monthly basis for bill generation. In this example, in the month of May 2015, bills were not generated for 95% of customer accounts. A user requested information about the profiles of and updates to data lineage elements in the upstream data lineage of the output data that was used to generate the May 2015 bills. The source profile data revealed that the dialing phone number field in the source data records that were used to generate the May 2015 bills had only 10 unique values, while the reference source profile data showed an expected range between 1.5 million and 2.4 million unique values in the dialing phone number field. Based on this review of the source profile data, the user determined that the source data records had been corrupted. The source data records were retrieved from a compressed storage and reprocessed to correctly generate the May 2015 bills.

In another specific example, a data processing system processes internal corporate financial records and assigns each financial record to a corporate division. The assignment of each financial record to a corporate division is carried out by mapping a department identifier in each record to one of six corporate divisions, as provided by a set of corporate reference data. The reference profile data for the corporate reference data indicated that the number of corporate divisions has been consistently six for the past ten years. The reference data is updated quarterly. After the most recent update, the reference data was profiled, showing that the number of corporate divisions in the reference data had increased to 60. The deviation of the profile of the updated reference data from the reference of six divisions was great enough to cause an alert message to be sent to a system administrator. In addition, further processing by the data processing system was halted until the reference data could be examined and corrected, if necessary.

Figure 7:
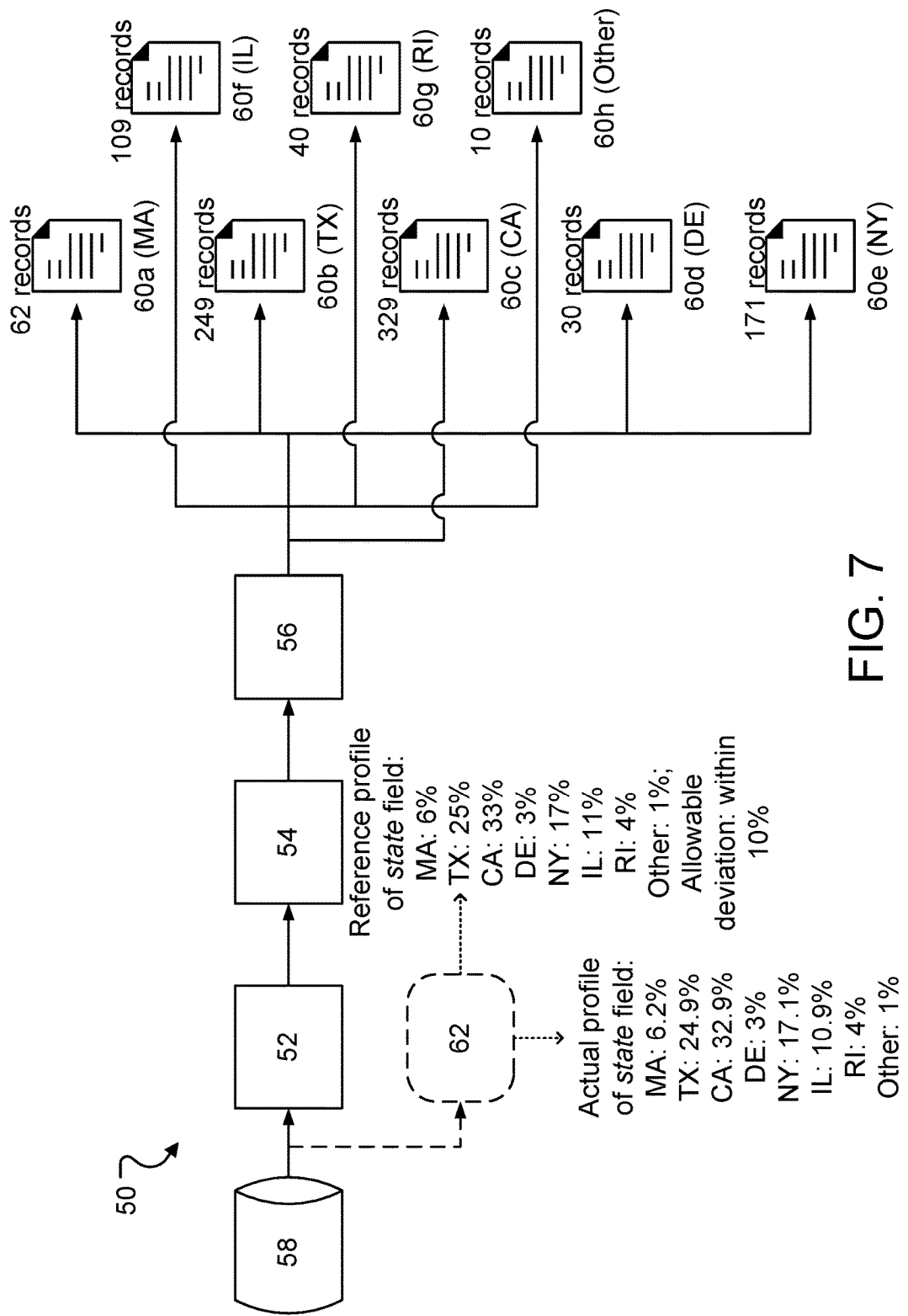
FIGS. 7, 8A, and 8B are diagrams of a data processing system.

Referring to FIG. 7, in a specific example, a data processing system 50 includes multiple transform elements 52, 54, 56 that process input data 58 including records of online purchases made at thebostonshop.com on Apr. 1, 2016. Each record of the input data 58 includes multiple fields, including a state field. In this example, the component 56 is a split component that sends each record of data to one of eight files 60a-60h based on the value in the state field of the input data. For instance, records having the value MA in the state field are sent to the file 60a; records having the value TX are sent to the file 60b; records having the value CA are sent to the file 60c; records having the value DE are sent to the file 60d; records having the value NY are sent to the file 60e; records having the value IL are sent to the file 60f; records having the value RI are sent to the file 60g; and records having any other value are sent to the file 60h. The number of records sent to each file are shown in FIG. 7. In the example of FIG. 7, the number of records sent to each file is within an expected range, and thus no data quality alerts are generated. This is due to the input data 58 falling within expected ranges.

The quality of the input data 58 is characterized by a quality element 62. The quality element 62 generates a profile of the state field of the input data 58 and applies an automatically generated rule that indicates an allowable deviation between the profile of the state field and a reference profile of the state field of input data. The reference profile represents the average profile of data processed by the data processing system 50 over the past year, and indicates an allowable deviation beyond which a potential data quality issue is to be identified. In this example, the automatically generated rule indicates that the input data 58 is to be identified as having a potential data quality issue if the distribution of values in the state field in the profile of the input data 58 varies from the distribution of values in the reference profile by more than 10%, where the reference profile of the state field indicates the following distribution of values in the state field:

MA: 6%
TX: 25%
CA: 33%
DE: 3%
NY: 17%
IL: 11%
RI: 4%
Any other value: 1%, with an allowable deviation of 10%. As can be seen from FIG. 7, the actual profile of the state field falls within the 10% allowable deviation of the reference profile, and thus there is no data quality issue with the input data.

Figure 8A:
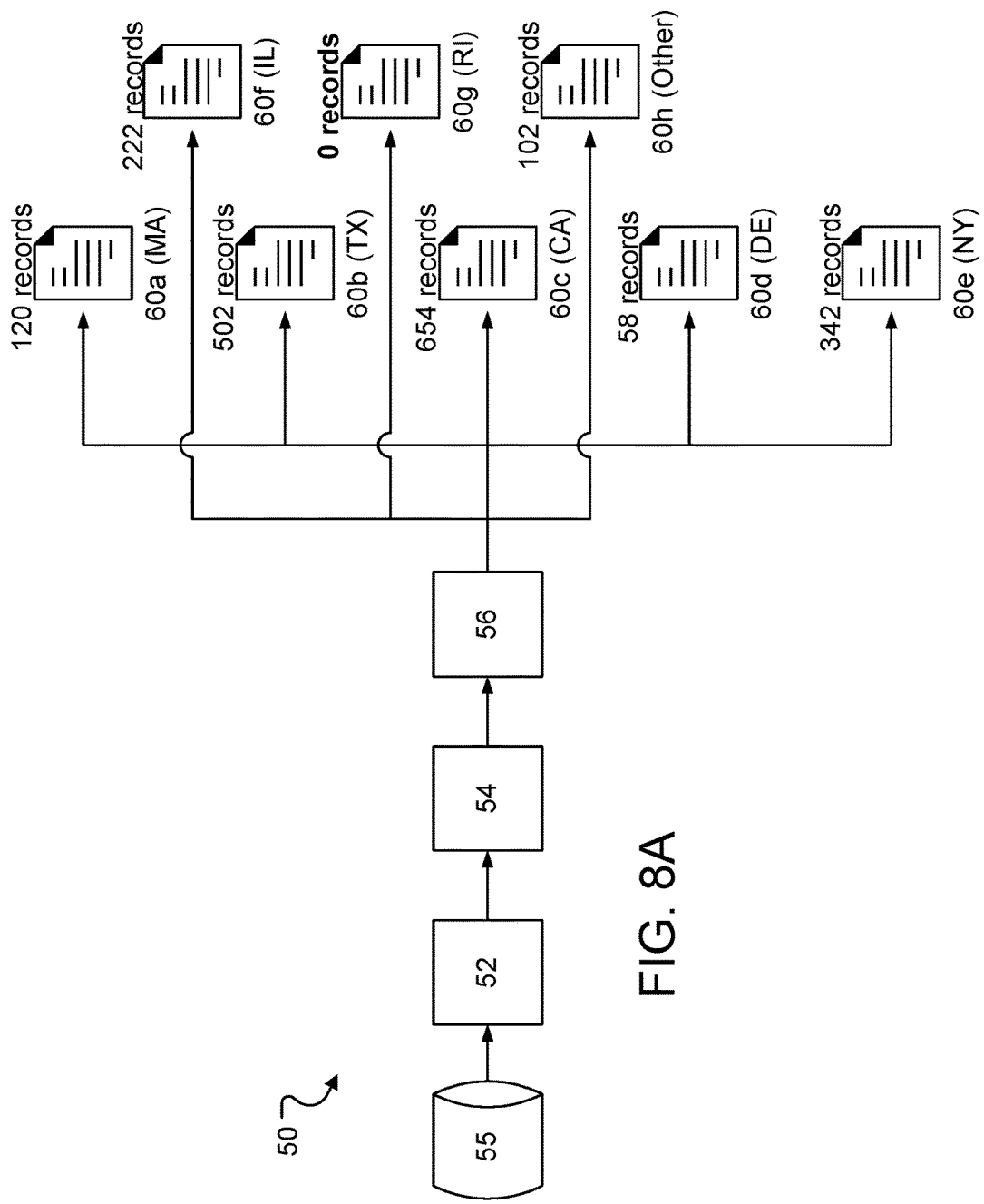

Referring to FIG. 8A, in an example of abnormal operation of the data processing system 50, input data 55 include records of online purchase made at the bostonshop.com on Apr. 2, 2016. In this example, no records are sent to the file 60g. An operator of the data processing system 50 may notice that the file 60a is empty, or the empty file may give rise to an error in further processing by a downstream data processing system. An operator of the data processing system 50 can track the root cause for which no records are sent to the file 60g by investigating the quality of upstream data elements within the data lineage of the files 60a-60h. In particular, the input data 55 belongs to the upstream data lineage of the files 60a-60h.

Figure 8B:
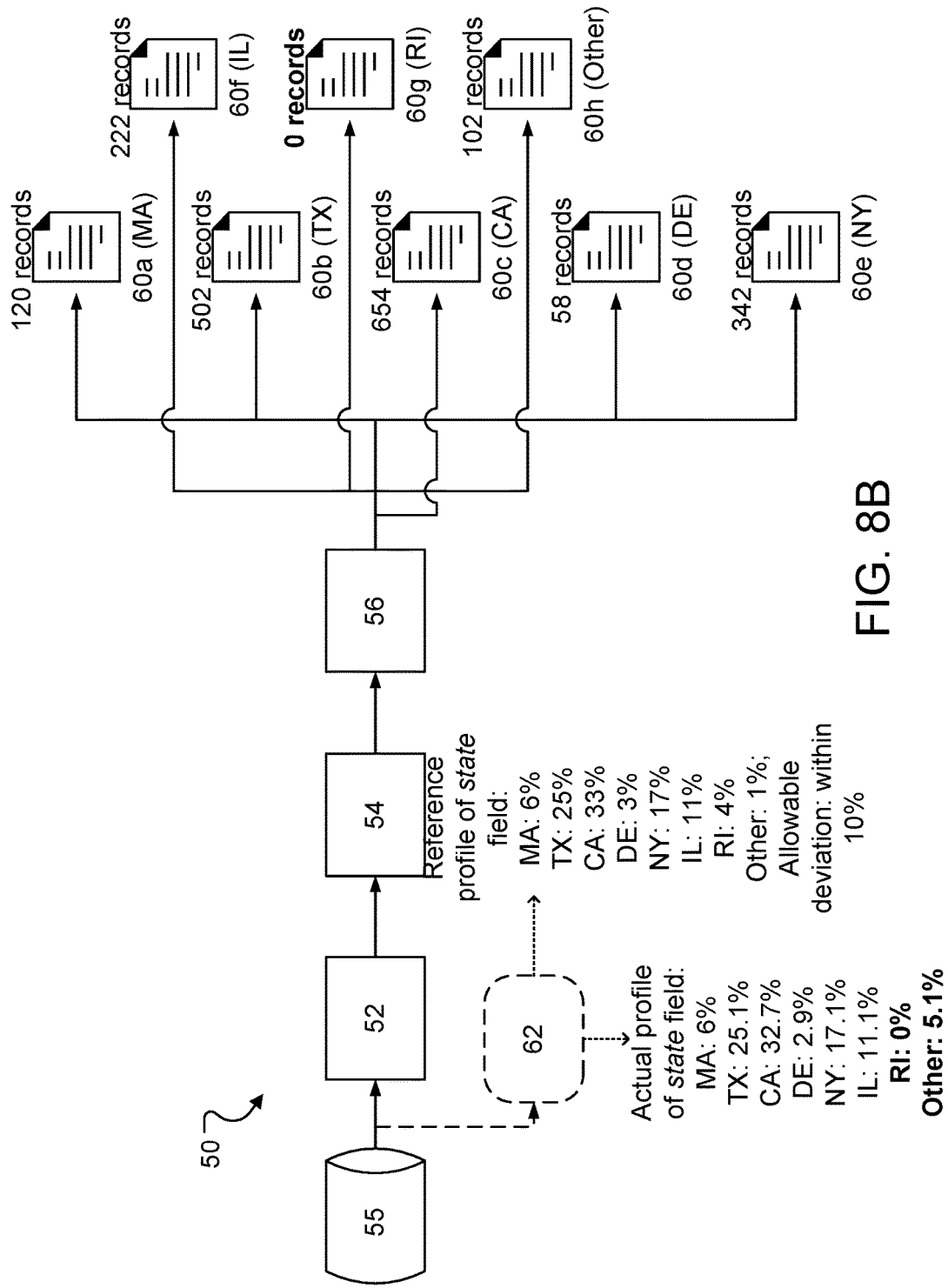

Referring also to FIG. 8B, the quality element 62 generates the following actual profile of the state field of the input data 55:

MA: 6%
TX: 25.1%
CA: 32.7%
DE: 2.9%
NY: 17.1%
IL: 11.1%
RI: 0%
Any other value: 5.1%

Because of the deviation between the profile of the state field of the input data 55 and the reference profile of the state field, the input data 55 is identified as having a potential data quality issue and an alert flag is stored to indicate the potential data quality issue. When the operator tracks the root cause of the empty file 60g, the operator can readily see that a potential data quality issue existed in the input data 55. The operator can then use this knowledge to investigate the cause of the deviation, e.g., to determine whether the input data 55 was corrupted, whether earlier processing of the input data 55 in an upstream data processing system gave rise to the deviation, or another cause. For instance, referring also to FIG. 8C, in this example, by viewing a portion of the actual input data 55, the operator may realize that the letters in the value "RI" were reversed to read "IR," causing these records to be sorted into the file 60h rather than into the file 60g.

Figure 9A:
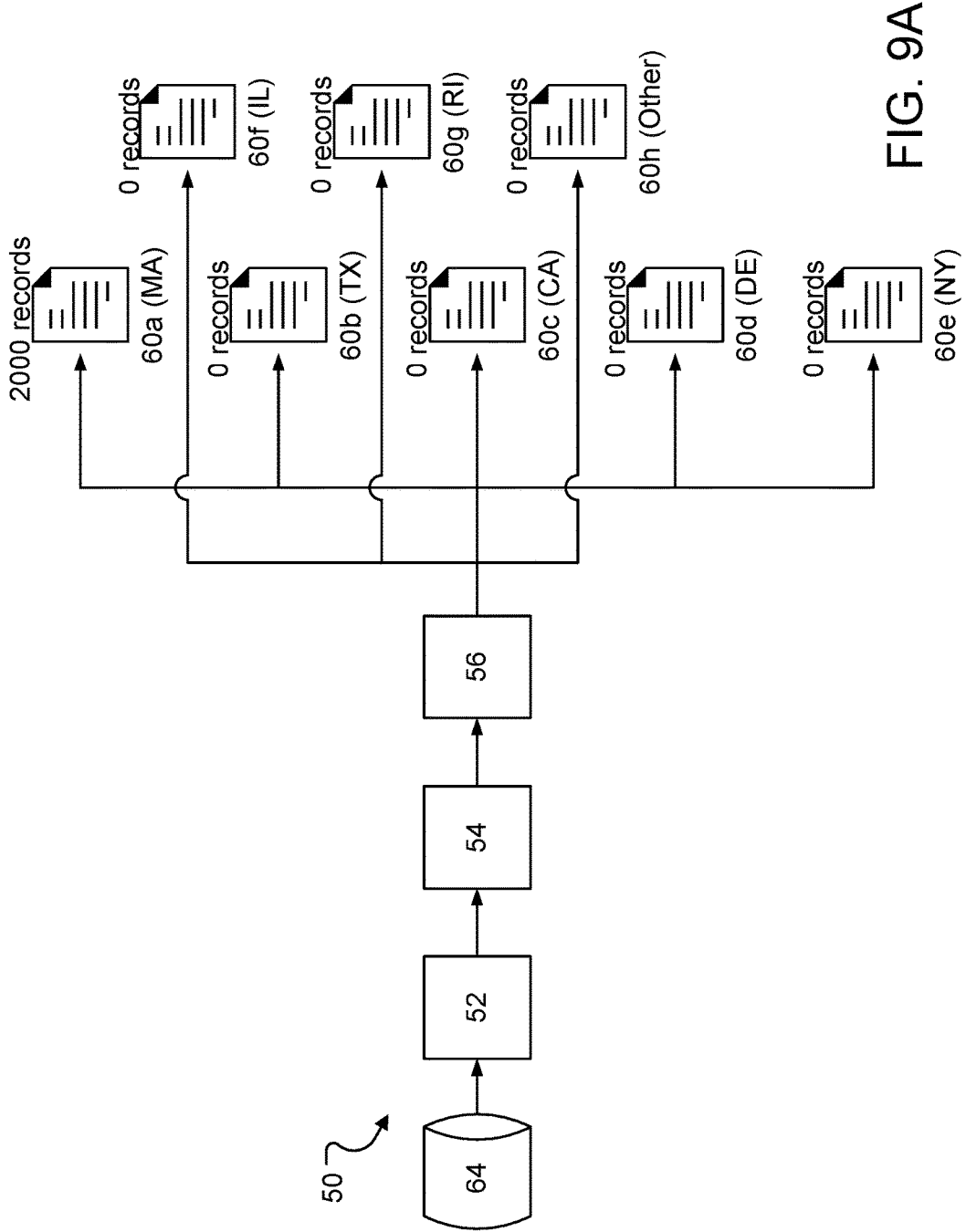
FIGS. 9A and 9B are diagrams of a data processing system.

Referring to FIG. 9A, in another example of abnormal operation of the data processing system 50, input data 64 include records of online purchases made at thebostonshop.com on Apr. 3, 2016. In this example, records are sent only to the file 60a and not to any of the other files 60b-60h. An operator of the data processing system 50 may notice that the files 60b-60h are empty, or the empty files may give rise to an error in further processing by a downstream data processing system.

Figure 9B:
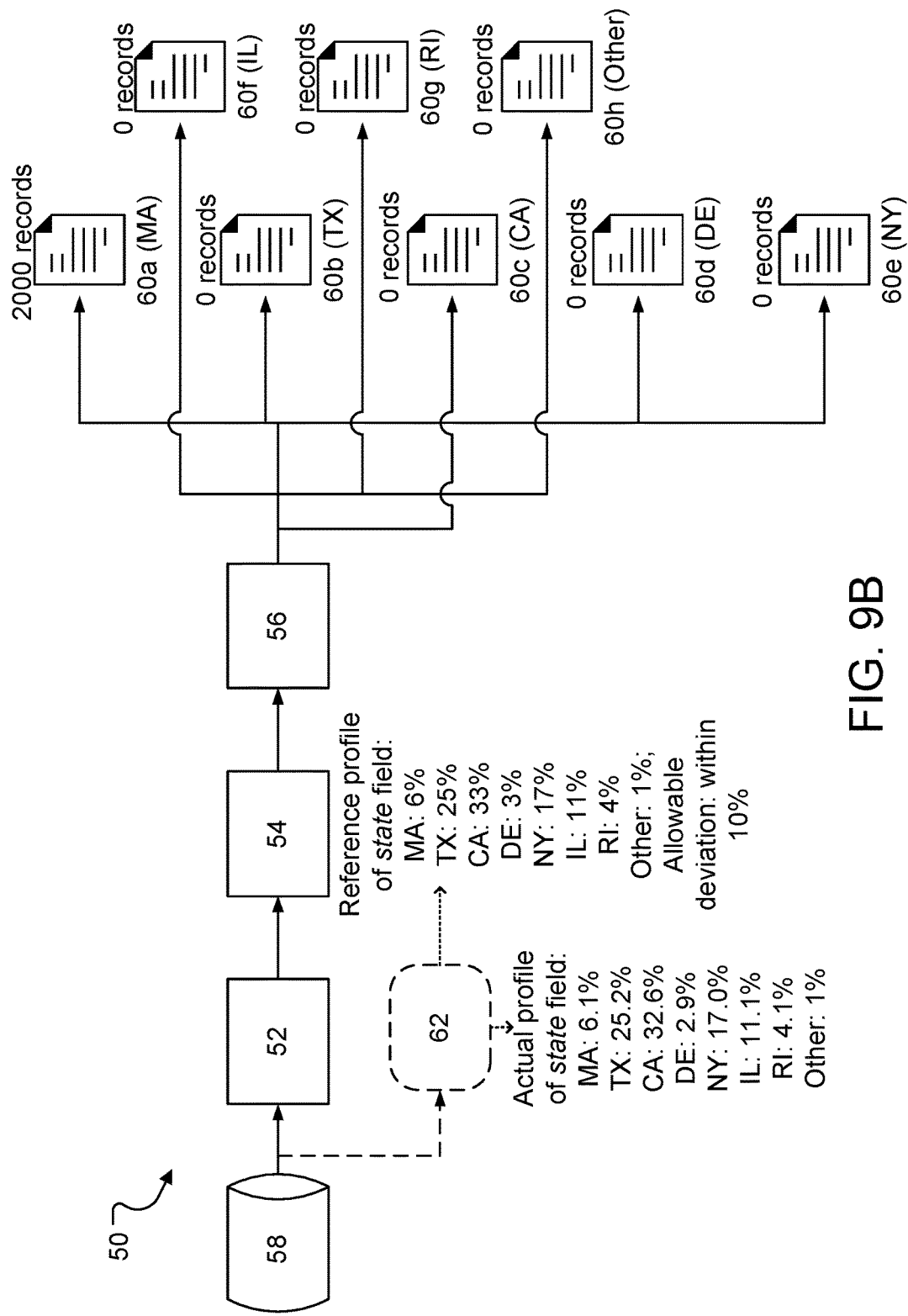

Referring also to FIG. 9B, an operator of the data processing system can track the root cause for which all of the records are sent to the file 60a by investigating the quality of the upstream data elements within the data lineage of the files 60a-60h. In this example, the quality element 62 generates the following profile of the state field of the input data 64:

MA: 6.1%
TX: 25.2%
CA: 32.6%
DE: 2.9%
NY: 17.0%
IL: 11.1%
RI: 4.1%
Any other value: 1%

The profile of the state field of the input data 64 is consistent with the reference profile of the state field, and thus no potential data quality issue is identified. The operator may then investigate the update status of the transform elements 52, 54, 56 that are in the data lineage of the files 60a-60h. For instance, the operator may determine that the transform element 56 was updated immediately before processing the input data 64, and thus the transform element 56 may be a root cause of the empty files 60*b*-60*h*.

Figure 10A:
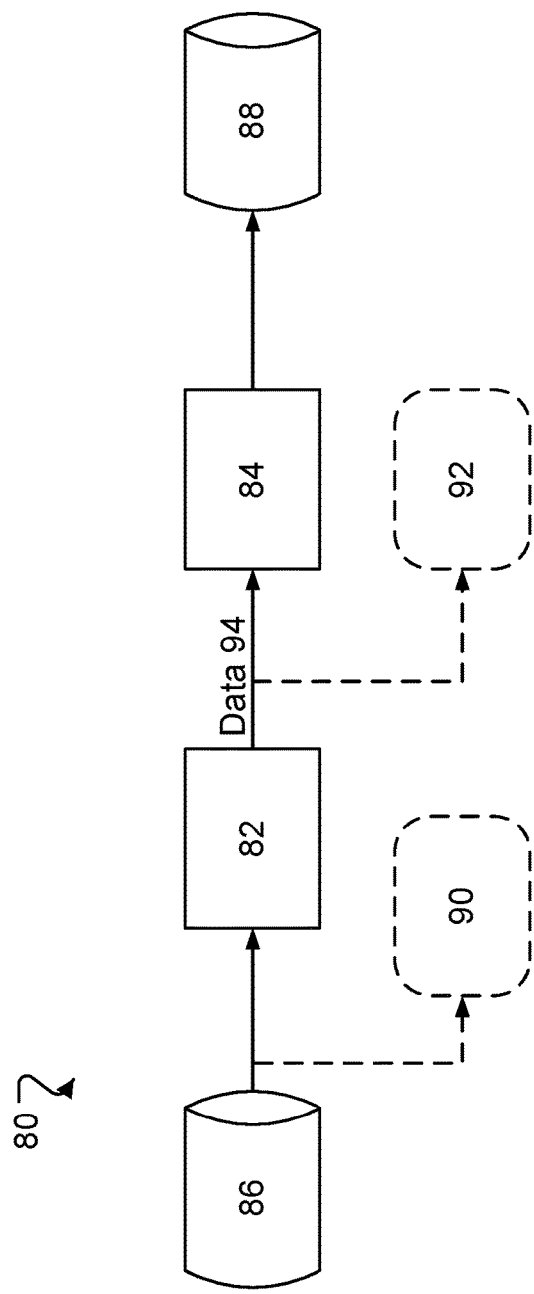
FIG. 10A is a diagram of a data processing system.

Referring to FIG. 10A, in a specific example, a data processing system 80 includes multiple transform elements 82, 84 that process a stream of input data 86 including phone records for mobile phone calls handled by a particular tower. Each record of the input data 86 includes multiple fields, including a phone_number field. The input data 86 are formatted by the transform element 82 and then sorted by the value in the phone_number field by the transform element 84, and output into a queue 88, from where they are fed into a second data processing system 90 for additional processing. In this example, 25% of the records fed from the queue 88 into the second data processing system 90 give rise to processing errors. An operator of the data processing system 80 can track the root cause of these processing errors by investigating the quality of the upstream data elements within the data lineage of the queue 88.

The quality of the input data 86 is characterized by a quality element 90 and the quality of data 94 output from the format transform element 82 is characterized by a quality element 92. Both quality elements 90, 92 apply a user-generated rule that specifies that the value in the phone_number field is to be a 10-digit integer, and that a potential data quality issue is to be identified if more than 3% of the records do not satisfy the rule. In this example, the quality element 90 determines that 0.1% of the records in the data 86 have an 11-digit integer in the phone_number field. Because the percentage of records is below the 3% threshold, the quality element 90 does not identify any potential data quality issues with the input data 86. The quality element 92 characterizes 25% of the records in the data 94 as having an alphanumeric value in the phone_number field. An example of a portion of the data 94 is shown in FIG. 10B. An alert flag is stored to indicate the potential data quality issue with the data 94. When the operator tracks the root cause of the processing errors, the operator can readily see that no data quality issues were identified in the input data 86, but that a potential data quality issue existed in the data 94.

Figure 11:
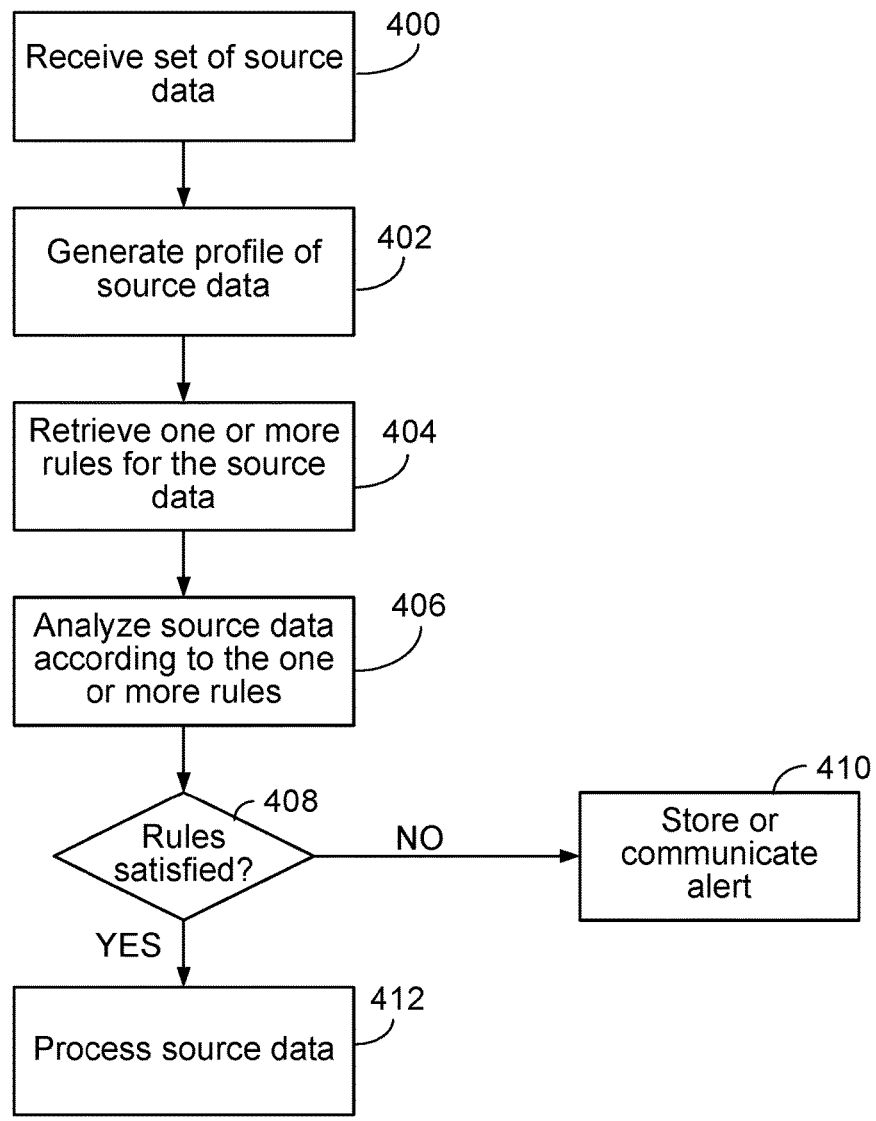
FIGS. 11-15 are flow charts.

Referring to FIG. 11, in an example process for determining the quality of a set of source data, of the set of source data is received into a data processing application (400). A profile of the set of source data is generated and stored (402). One or more rules for the set of source data is retrieved (404). The source data or the profile of the source data is analyzed according to the one or more rules (406). If the one or more rules are not satisfied by the set of source data (408), an alert indicative of a potential data quality issue is stored along with the profile data, communicated to a user, or both (410); and the source data is added to a list of data sets with possible data quality issues. If the one or more rules are satisfied by the source data (408), the source data is processed by the data processing application (412). In some cases, such as for extreme deviations from thresholds or allowable values specified by a rule, processing is halted until user intervention enables the processing to be restarted. During or after processing, the user is enabled to access the stored profile data, for instance, in order to investigate potential root causes of downstream data quality issues.

Figure 12:
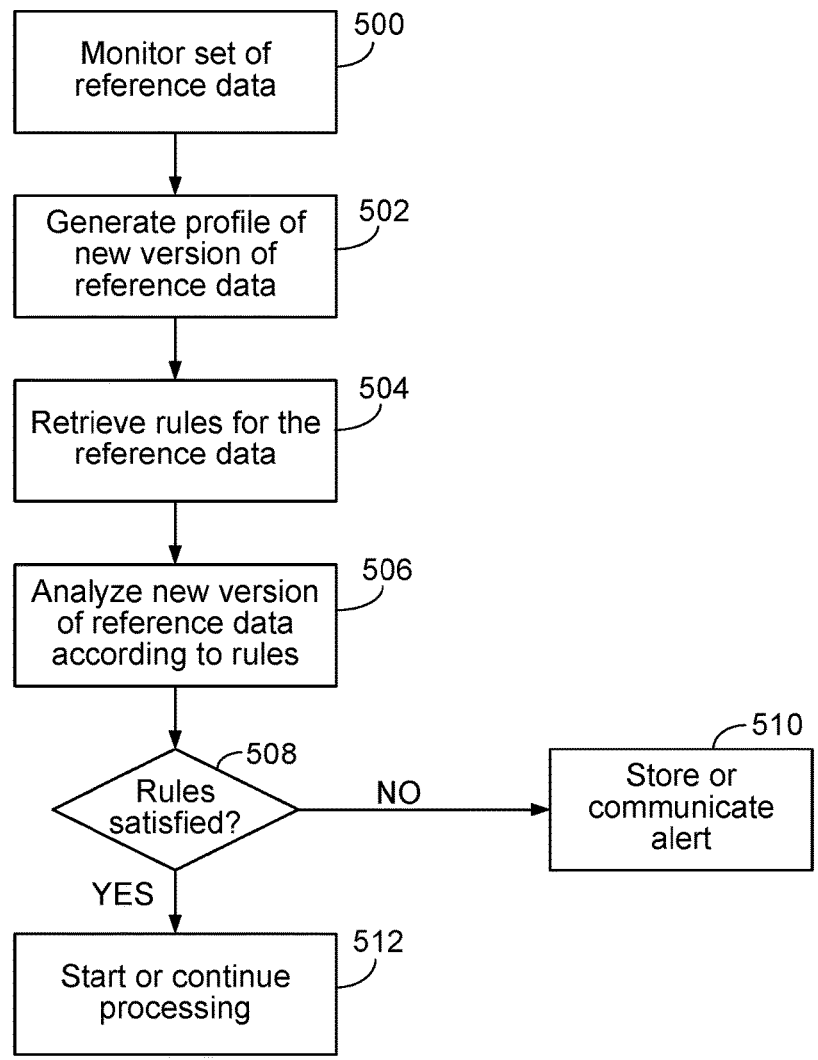

Referring to FIG. 12, in an example process for monitoring the quality of reference data in a data processing system, a set of reference data is monitored (500). When the set of reference data is updated, a profile of the new version of the reference data is generated and stored (502). For instance, profile generation can be performed after each scheduled update to the reference data. One or more rules for the set of reference data is retrieved (504). The new version of the reference data or the profile of the new version of the reference data is analyzed (506) according to the one or more rules. If the one or more rules are not satisfied by the new version of the reference data (508), an alert indicative of a possible data quality issue is stored along with the profile data, communicated to a user, or both (510). If the one or more rules are satisfied by the new version of the reference data (508), subsequent processing by the data processing system is allowed to start or continue (512). In some cases, such as for extreme deviations from thresholds or allowable values specified by a rule, processing is halted until user intervention allows processing to start or continue. During or after processing, the user is enabled to access the stored profile data, for instance, in order to investigate potential root causes of downstream data quality issues.

In some examples, the rules are analyzed before applying the rules, e.g., to determine an update date for each rule. If a rule is older than a threshold age, the rule may not be applied, or a user may be alerted that the rule may be ready for an update.

Figure 13:
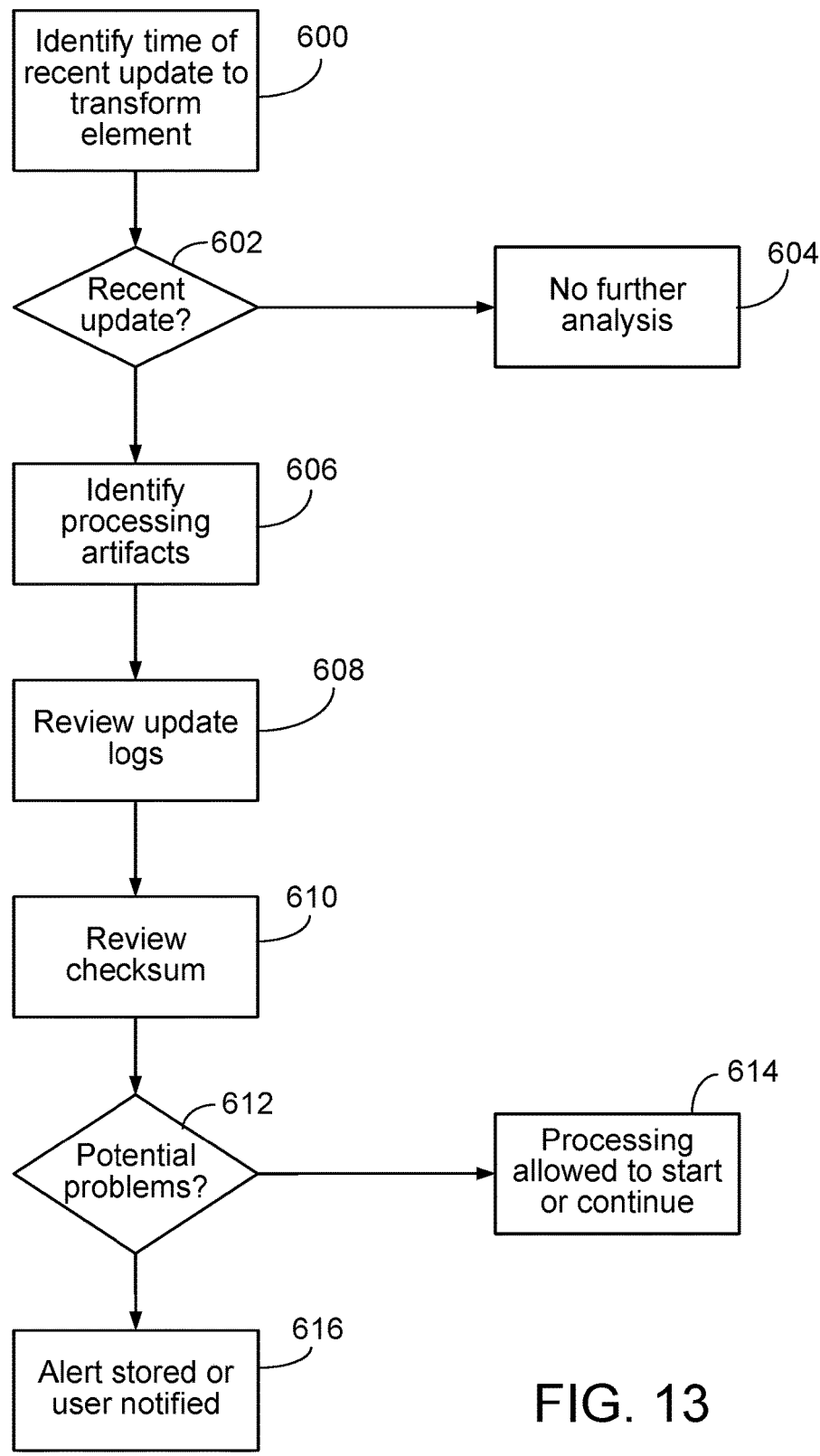

Referring to FIG. 13, in an example process for analyzing an update to a transform element, the time of a recent update to the transform element is identified (600). For instance, the timestamp of the recent update can be stored in a data repository. If the transform element did not have a recent update (602), the update to the transform element is not further analyzed (604). A recent update can be an update within a threshold amount of time, such as within ten minutes, within one hour, within one day, or within another amount of time. If the transform element was recently updated (602), any processing artifacts are identified (606). Update logs associated with the transform element are reviewed (608) to identify any inconsistencies between the update log and the timestamp of the recent update stored in the data repository. A checksum or other system data associated with the transform element are reviewed (610) for an indication of any potential errors that may have been introduced during the updating of the transform element. If no potential problems are identified (612), processing by the system is allowed to start or continue (614). If one or more potential problems are identified (612), an alert indicative of a potential problem with the transform element is stored in the data repository, communicated to a user, or both (616). Processing by the data processing system may be allowed to start or continue or may be halted until user intervention allows processing to start or continue.

Figure 14:
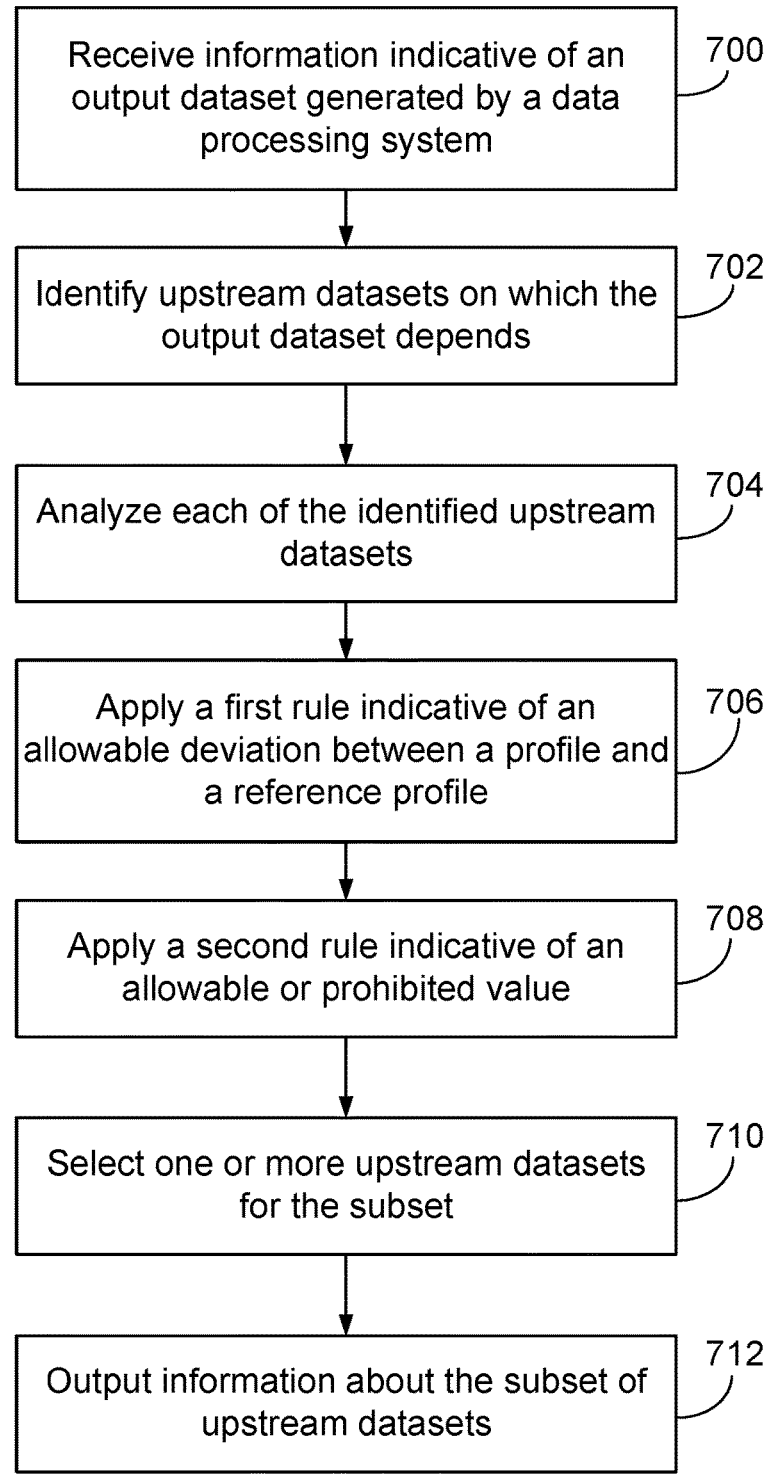

FIG. 14 is a flow chart of an example process. Information indicative of an output dataset generated by a data processing system is received (700). One or more upstream datasets on which the output dataset depends are identified based on data lineage information relating to the output dataset (702). The data lineage information indicates one or more datasets that the output dataset depends on and one or more datasets that depend on the output dataset or both. Each of the identified upstream datasets on which the output dataset depends is analyzed to identify a subset of the datasets, including determining which of the one or more datasets have errors or possible errors (704). For each particular upstream dataset, a first rule indicative of an allowable deviation between a profile of the particular upstream dataset and a reference profile for the particular upstream dataset is applied (706) and a second rule indicative of an allowable value or prohibited value for one or more data elements in the particular upstream dataset is applied (708). In some examples, only the first rule or only the second rule is applied. The first rule or the second rule or both can be automatically generated or specified by a user. Based on the results of applying the first rule or the second rule or both, one or more of the upstream datasets are selected for a subset (710). Information associated with the subset of the upstream datasets is outputted (712).

Figure 15:
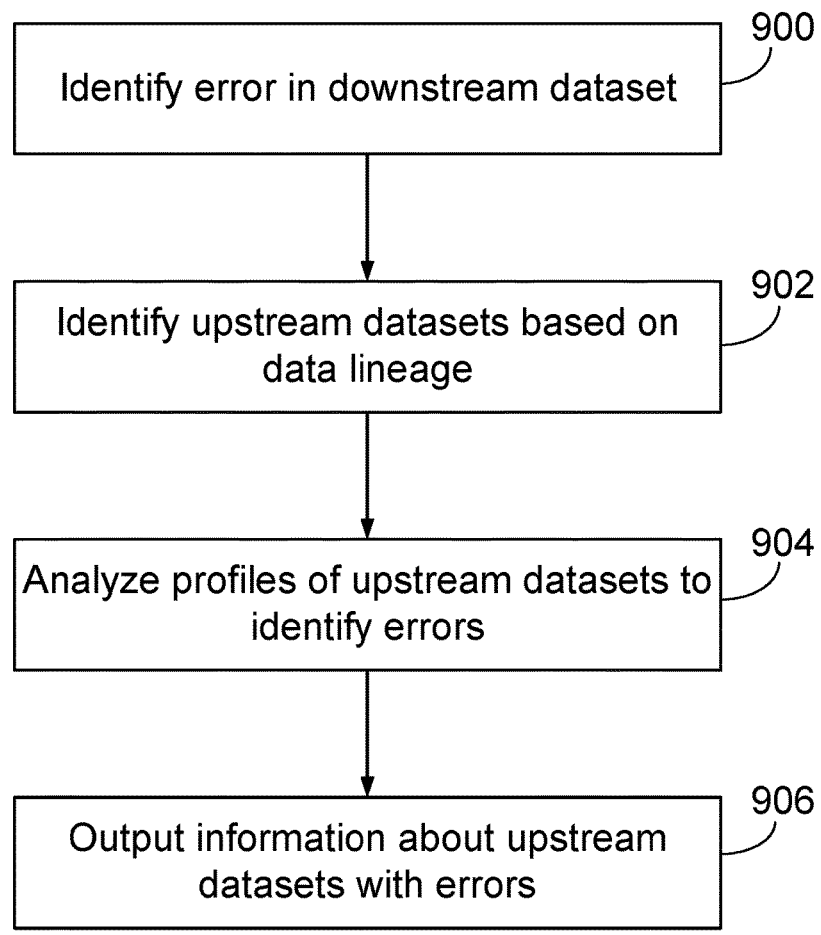

FIG. 15 is a flow chart of an example process. An error or possible error in a data element of a downstream dataset of a data processing system is identified (900), e.g., automatically or based on user input. One or more upstream datasets that affect the data element are automatically identified based on data lineage information relating to the downstream dataset (902). A determination is made of which upstream datasets have or likely have errors, which includes analyzing a current profile and a reference profile of each of the identified upstream datasets (904). For instance, each upstream dataset can be analyzed by applying one or more rules to each of the current profiles. The rules can be indicative of an allowable deviation between a current profile of a particular upstream dataset and the corresponding reference profile of the particular upstream dataset. The rules can be indicative of an allowable value for a data element in a particular upstream dataset. Information associated with each of the upstream datasets that have or likely have errors is outputted (906).

The techniques for monitoring and tracking of data quality described here are rooted in computer technology and can be used to address issues that arise during execution of computer implemented processes. For instance, the processing of a dataset by a computer-implemented data processing system can be monitored and made more efficient, effective, or accurate using the techniques for monitoring and tracking described here. In addition, the techniques described here can be applied to help a user, such as a system administrator, to manage operation of the data processing system.

Figure 16:
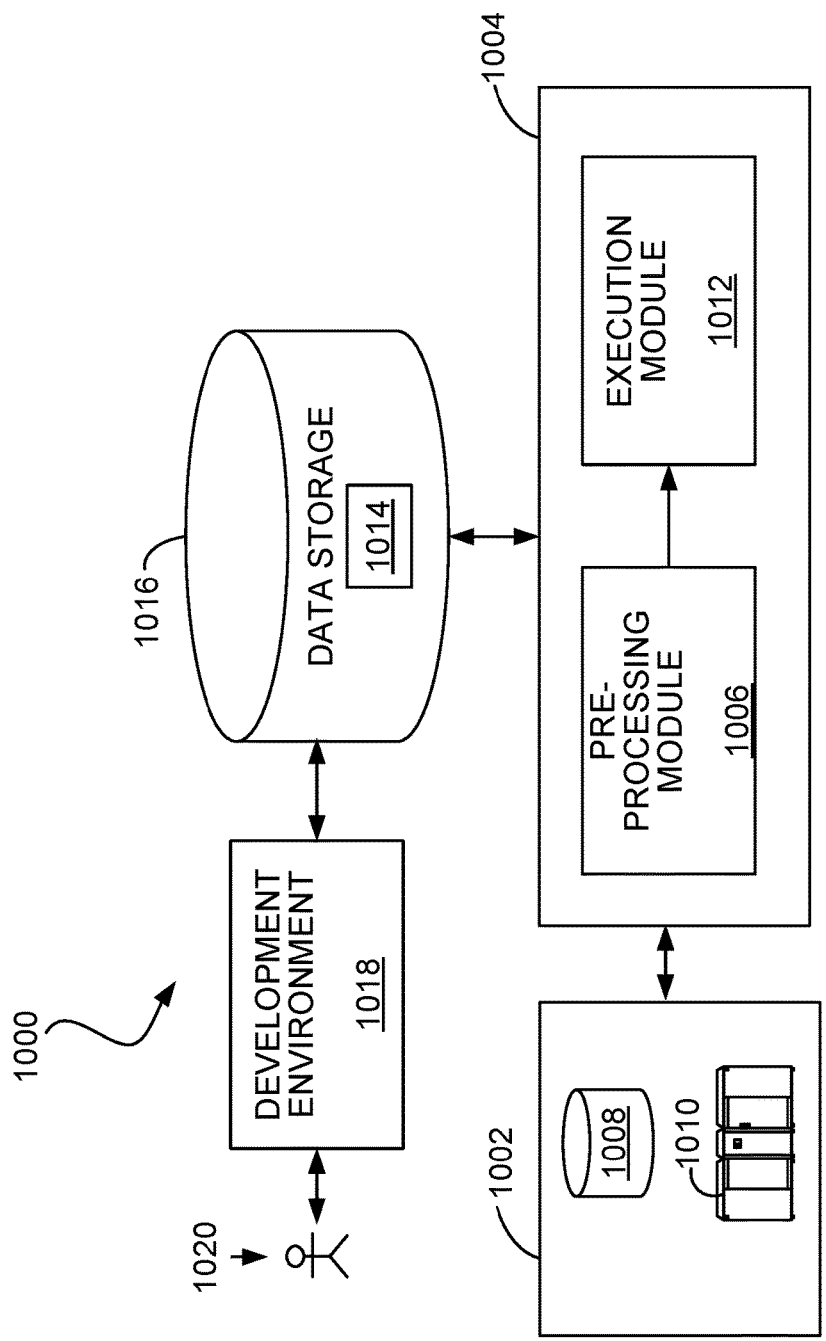
FIG. 16 is a system diagram.

FIG. 16 shows an example of a data processing system 1000 in which the techniques for monitoring and tracking can be used. The system 1000 includes a data source 1002 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or machine data. An execution environment 1004 includes a pre-processing module 1006 and an execution module 1012. The execution environment 1004 may be hosted, for example, on one or more general-purpose computers under the control of a suitable operating system, such as a version of the UNIX operating system. For example, the execution environment 1004 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 1002 may be local to the execution environment 1004, for example, being stored on a storage medium (e.g., hard drive 1008) connected to a computer hosting the execution environment 1004, or may be remote to the execution environment 1004, for example, being hosted on a remote system (e.g., mainframe computer 1010) in communication with a computer hosting the execution environment 1004, over a remote connection (e.g., provided by a cloud computing infrastructure).

The pre-processing module 1006 reads data from the data source 1002 and prepares data processing applications for execution. For instance, the pre-processing module 1006 can compile a data processing application, store and/or load a compiled data processing application to and/or from a data storage system 1016 accessible to the execution environment 1004, and perform other tasks to prepare a data processing application for execution.

The execution module 1012 executes the data processing application prepared by the pre-processing module 1006 to process a set of data and generate output data 1014 that results from the processing. The output data 1014 may be stored back in the data source 1002 or in a data storage system 1016 accessible to the execution environment 1004, or otherwise used. The data storage system 1016 is also accessible to a development environment 1018 in which a developer 1020 is able to design and edit the data processing applications to be executed by the execution module 1012. The development environment 1018 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," the contents of which are incorporated herein by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 1006 can receive data from a variety of types of systems that may embody the data source 1002, including different forms of database systems. The data may be organized as records having values for respective fields (also called "attributes" or "columns"), including possibly null values. When first reading data from a data source, the pre-processing module 1006 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

The monitoring and tracking approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:
   receiving information indicative of an output dataset generated by a data processing system;
   identifying, based on data lineage information relating to the output dataset, one or more upstream datasets on which the output dataset depends;
   analyzing one or more of the identified one or more upstream datasets on which the output dataset depends, the analyzing including:
     for each particular upstream dataset of the one or more upstream datasets, applying one or more of:
       (i) a first rule indicative of an allowable deviation between a profile of the particular upstream dataset and a reference profile for the particular upstream dataset, and
       (ii) a second rule indicative of one or more allowable values or prohibited values for each of one or more data elements in the particular upstream dataset;
   based on the results of applying the one or more rules, selecting one or more of the upstream datasets; and
   outputting information associated with the selected one or more upstream datasets.

2. The method of claim 1, in which one or more of the first rule and the second rule are automatically generated.

3. The method of claim 2, in which the first rule is automatically generated based on an automated analysis of historical profiles of the particular upstream dataset.

4. The method of claim 3, in which the reference profile is based on an historical average profile for the particular upstream dataset.

5. The method of claim 2, in which the second rule is automatically generated based on an automated analysis of historical values for the one or more data elements in the particular upstream dataset.

6. The method of claim 5, in which the allowable value or prohibited value is determined based on the automated analysis.

7. The method of claim 1, in which one or more of the first rule and the second rule are specified by a user.

8. The method of claim 1, including receiving a specification of one or more of the first rule and the second rule through a user interface.

9. The method of claim 1, in which data lineage information indicates one or more datasets that the output dataset depends on, one or more datasets that depend on the output dataset, or both.

10. The method of claim 1, in which analyzing each of the one or more datasets to identify a subset of the datasets includes determining which of the one or more datasets have errors or possible errors; and
    including selecting the datasets that have errors or possible errors for the subset.

11. The method of claim 1, in which analyzing each of the one or more datasets to identify a subset of the datasets includes identifying a particular dataset for which the deviation between the profile of the particular dataset and the reference profile for the particular dataset exceeds the allowable deviation indicated by the corresponding first rule; and
    including selecting the particular dataset for the subset.

12. The method of claim 1, in which analyzing each of the one or more datasets to identify a subset of the datasets includes identifying a particular dataset having a data element with a value that does not satisfy the allowable or prohibited value indicated by the corresponding second rule; and
    including selecting the particular dataset for the subset.

13. The method of claim 1, including identifying a data element in the output dataset, and in which identifying the one or more datasets on which the output dataset depends includes identifying datasets that affect the identified data element in the output dataset.

14. The method of claim 13 in which identifying a data element in the output dataset includes identifying a data element that has an error or a possible error.

15. The method of claim 1, including generating a profile of one or more of the upstream datasets.

16. The method of claim 15 in which generating a profile of a particular dataset includes generating a new profile of the particular dataset when a new version of the particular dataset is received.

17. The method of claim 1 in which the reference profile for a particular dataset is derived from one or more previous profiles of the particular dataset.

18. The method of claim 1, in which outputting information associated with the subset of datasets includes outputting an identifier of each of the datasets of the subset.

19. The method of claim 1, in which outputting information associated with the subset of datasets includes outputting an indicator of an error or possible error associated with each of the datasets of the subset.

20. The method of claim 1, including displaying a representation of the data processing system on a user interface, and in which outputting information associated with the subset of datasets includes displaying information associated with a particular dataset of the subset in a vicinity of a representation of the particular dataset of the subset of datasets.

21. The method of claim 20 in which the displayed information associated with the particular dataset of the subset includes a value indicative of a deviation between the profile of the particular dataset and the reference profile for the particular dataset.

22. The method of claim 20 in which the displayed information associated with the particular dataset of the subset includes a value representative of a number of data elements in the particular dataset that do not satisfy the allowable value or prohibited indicated by the corresponding second rule.

23. The method of claim 20, including displaying an information bubble or pop-up window showing information about the subset of datasets.

24. The method of claim 1, including providing a user interface to enable a user to add a rule, modify a rule, or remove a rule.

25. The method of claim 1 in which the datasets include one or more source datasets and one or more reference datasets, the source datasets including data elements to be processed by the data processing system, the reference datasets including reference values that are referenced by the data processing system in processing the data elements in the source datasets.

26. The method of claim 25 in which the reference datasets include data associated with a business entity associated with the data processing system and the source datasets include data associated with customers of the business entity.

27. The method of claim 1 in which the data processing system includes transform elements, and the method includes identifying, based on the data lineage information, one or more transform elements that affect the output dataset.

28. The method of claim 27 including determining which one or more of the transform elements have errors or possible errors.

29. The method of claim 28, including determining whether a particular data processing elements has errors or possible errors based on an implementation date associated with the particular transform element.

30. A non-transitory computer-readable medium storing instructions for causing a computing system to:
receive information indicative of an output dataset generated by a data processing system;
identify, based on data lineage information relating to the output dataset, one or more upstream datasets on which the output dataset depends;
analyze one or more of the identified one or more upstream datasets on which the output dataset depends, the analyzing including:
for each particular upstream dataset of the one or more upstream datasets, applying one or more of:
(i) a first rule indicative of an allowable deviation between a profile of the particular upstream dataset and a reference profile for the particular upstream dataset, and
(ii) a second rule indicative of one or more allowable values or prohibited values for each of one or more data elements in the particular upstream dataset;
based on the results of applying the one or more rules, selecting one or more of the upstream datasets; and
output information associated with the selected one or more upstream datasets.

31. A computing system including:
one or more processors coupled to a memory, the one or more processors and memory configured to:
receive information indicative of an output dataset generated by a data processing system;
identify, based on data lineage information relating to the output dataset, one or more upstream datasets on which the output dataset depends;
analyze one or more of the identified one or more upstream datasets on which the output dataset depends, the analyzing including:
for each particular upstream dataset of the one or more upstream datasets, applying one or more of:
(i) a first rule indicative of an allowable deviation between a profile of the particular upstream dataset and a reference profile for the particular upstream dataset, and
(ii) a second rule indicative of one or more allowable values or prohibited values for each of one or more data elements in the particular upstream dataset;
based on the results of applying the one or more rules, selecting one or more of the upstream datasets; and
output information associated with the selected one or more upstream datasets.

32. A computing system including:
means for receiving information indicative of an output dataset generated by a data processing system;
means for identifying, based on data lineage information relating to the output dataset, one or more upstream datasets on which the output dataset depends;
means for analyzing one or more of the identified one or more upstream datasets on which the output dataset depends, the analyzing including:
for each particular upstream dataset of the one or more upstream datasets, applying one or more of:
(i) a first rule indicative of an allowable deviation between a profile of the particular upstream dataset and a reference profile for the particular upstream dataset, and
(ii) a second rule indicative of one or more allowable values or prohibited values for each of one or more data elements in the particular upstream dataset;
based on the results of applying the one or more rules, selecting one or more of the upstream datasets; and
means for outputting information associated with the selected one or more upstream datasets.

33. The non-transitory computer-readable medium of claim 30, in which one or more of the first rule and the second rule are automatically generated.

34. The non-transitory computer-readable medium of claim 30, the instructions causing the computing system to receive a specification of one or more of the first rule and the second rule through a user interface.

35. The non-transitory computer-readable medium of claim 30, in which analyzing each of the one or more datasets to identify a subset of the datasets includes determining which of the one or more datasets have errors or possible errors; and the instructions causing the computing system to select the datasets that have errors or possible errors for the subset.

36. The non-transitory computer-readable medium of claim 30, in which analyzing each of the one or more datasets to identify a subset of the datasets includes identifying a particular dataset for which the deviation between the profile of the particular dataset and the reference profile for the particular dataset exceeds the allowable deviation indicated by the corresponding first rule; and the instructions causing the computing system to select the particular dataset for the sub set.

37. The non-transitory computer-readable medium of claim 30, in which analyzing each of the one or more datasets to identify a subset of the datasets includes identifying a particular dataset having a data element with a value that does not satisfy the allowable or prohibited value indicated by the corresponding second rule; and the instructions causing the computing system to select the particular dataset for the sub set.

38. The non-transitory computer-readable medium of claim 30, the instructions causing the computing system to identify a data element in the output dataset, and in which identifying the one or more datasets on which the output dataset depends includes identifying datasets that affect the identified data element in the output dataset.

39. The non-transitory computer-readable medium of claim 30, the instructions causing the computing system to generate a profile of one or more of the upstream datasets.

40. The non-transitory computer-readable medium of claim 30, the instructions causing the computing system to display a representation of the data processing system on a user interface, and in which outputting information associated with the subset of datasets includes displaying information associated with a particular dataset of the subset in a vicinity of a representation of the particular dataset of the subset of datasets.

41. The non-transitory computer-readable medium of claim 30, the instructions causing the computing system to provide a user interface to enable a user to add a rule, modify a rule, or remove a rule.

42. The non-transitory computer-readable medium of claim 30, in which the data processing system includes transform elements, and the instructions causing the computing system to identify, based on the data lineage information, one or more transform elements that affect the output dataset.

43. The non-transitory computer-readable medium of claim 42 the instructions causing the computing system to determine which one or more of the transform elements have errors or possible errors.

44. The non-transitory computer-readable medium of claim 43, the instructions causing the computing system to determine whether a particular data processing elements has errors or possible errors based on an implementation date associated with the particular transform element.

45. The computing system of claim 31, in which one or more of the first rule and the second rule are automatically generated.

46. The computing system of claim 31, the one or more processors and memory configured to receive a specification of one or more of the first rule and the second rule through a user interface.

47. The computing system of claim 31, in which analyzing each of the one or more datasets to identify a subset of the datasets includes determining which of the one or more datasets have errors or possible errors; and the one or more processors and memory configured to select the datasets that have errors or possible errors for the subset.

48. The computing system of claim 31, in which analyzing each of the one or more datasets to identify a subset of the datasets includes identifying a particular dataset for which the deviation between the profile of the particular dataset and the reference profile for the particular dataset exceeds the allowable deviation indicated by the corresponding first rule; and the one or more processors and memory configured to select the particular dataset for the sub set.

49. The computing system of claim 31, in which analyzing each of the one or more datasets to identify a subset of the datasets includes identifying a particular dataset having a data element with a value that does not satisfy the allowable or prohibited value indicated by the corresponding second rule; and the one or more processors and memory configured to select the particular dataset for the sub set.

50. The computing system of claim 31, the one or more processors and memory configured to identify a data element in the output dataset, and in which identifying the one or more datasets on which the output dataset depends includes identifying datasets that affect the identified data element in the output dataset.

51. The computing system of claim 31, the one or more processors and memory configured to generate a profile of one or more of the upstream datasets.

52. The computing system of claim 31, the one or more processors and memory configured to display a representation of the data processing system on a user interface, and in which outputting information associated with the subset of datasets includes displaying information associated with a particular dataset of the subset in a vicinity of a representation of the particular dataset of the subset of datasets.

53. The computing system of claim 31, the one or more processors and memory configured to provide a user interface to enable a user to add a rule, modify a rule, or remove a rule.

54. The computing system of claim 31 in which the data processing system includes transform elements, and in which the one or more processors and memory are configured to identify, based on the data lineage information, one or more transform elements that affect the output dataset.

55. The computing system of claim 54 the one or more processors and memory configured to determine which one or more of the transform elements have errors or possible errors.

56. The computing system of claim 55, the one or more processors and memory configured to determine whether a particular data processing elements has errors or possible errors based on an implementation date associated with the particular transform element.

* * * * *